US012588110B2

(12) United States Patent
Sillito et al.

(10) Patent No.: US 12,588,110 B2
(45) **Date of Patent: *Mar. 24, 2026**

(54) HEATING ELEMENT UNIT

(71) Applicant: Chromalox, Inc., Pittsburgh, PA (US)

(72) Inventors: Broman Sillito, Pittsburgh, PA (US); Jacob Weller, Pittsburgh, PA (US); Cole Alexander, Pittsburgh, PA (US)

(73) Assignee: Chromalox, Inc., Pittsburgh, PA (US)

( * ) Notice: Subject to any disclaimer, the term of this patent is extended or adjusted under 35 U.S.C. 154(b) by 1111 days.

This patent is subject to a terminal disclaimer.

(21) Appl. No.: 17/571,768

(22) Filed: Jan. 10, 2022

(65) Prior Publication Data

US 2023/0225015 A1 Jul. 13, 2023

(51) Int. Cl.

| | |
|---|---|
| ***H05B 3/56*** | (2006.01) |
| ***H05B 3/06*** | (2006.01) |
| ***H05B 3/18*** | (2006.01) |
| ***H05B 3/44*** | (2006.01) |

(52) U.S. Cl.

CPC ................ *H05B 3/56* (2013.01); *H05B 3/06* (2013.01); *H05B 3/18* (2013.01); *H05B 3/44* (2013.01); *H05B 2203/017* (2013.01)

(58) Field of Classification Search

CPC ... H05B 3/56; H05B 3/06; H05B 3/18; H05B 3/44; H05B 2203/017

See application file for complete search history.

(56) References Cited

U.S. PATENT DOCUMENTS

| | | | | |
|---|---|---|---|---|
| 3,571,477 | A * | 3/1971 | Phillips | H05B 3/64 373/110 |
| 3,805,024 | A | 4/1974 | Joeckel et al. | |
| 5,034,595 | A | 7/1991 | Grendys | |
| 8,426,779 | B2 | 4/2013 | Schlipf | |
| 12,245,338 | B2 * | 3/2025 | Chen | H05B 3/16 |
| 2003/0042241 | A1 * | 3/2003 | Uekawa | H05B 3/0095 219/469 |

(Continued)

FOREIGN PATENT DOCUMENTS

| | | | | |
|---|---|---|---|---|
| EP | 2221834 B1 | | 9/2011 | |
| FR | 2754128 A1 | * | 4/1998 | H05B 3/48 |
| FR | 3028708 A3 | | 5/2016 | |

OTHER PUBLICATIONS

FR2754128A1—translation (Year: 2025).*

(Continued)

*Primary Examiner* — Elizabeth M Kerr
*Assistant Examiner* — Keith Brian Assante
(74) *Attorney, Agent, or Firm* — Faegre Drinker Biddle & Reath LLP

(57) ABSTRACT

A heating element unit for an electric resistance heater comprises: a casing; a heating element within the casing; an electrical supply pin in electrical contact with the heating element; an electrically insulating filler between the heating element and the casing; and an electrically insulating barrier provided between portions of the heating element, the electrical supply pin and/or the casing. The electrically insulating barrier has a greater dielectric strength than the electrically insulating filler, and the dielectric strength of the electrically insulating barrier is greater than about 1500 kV/m (greater than about 40 V/mil).

20 Claims, 4 Drawing Sheets

(56) References Cited

U.S. PATENT DOCUMENTS

| | | | | |
|---|---|---|---|---|
| 2005/0115958 | A1* | 6/2005 | Hoh | H05B 6/1263 219/620 |
| 2007/0023418 | A1 | 2/2007 | Schlipf | |
| 2015/0285033 | A1* | 10/2015 | Noel | H05B 3/56 392/301 |
| 2020/0249098 | A1* | 8/2020 | Zoppas | G01K 7/16 |
| 2021/0112634 | A1* | 4/2021 | Schlipf | H05B 3/52 |
| 2021/0136876 | A1 | 5/2021 | Dinauer et al. | |
| 2022/0141924 | A1 | 5/2022 | Neilson et al. | |
| 2023/0213239 | A1 | 7/2023 | Ekstrm | |

OTHER PUBLICATIONS

Extended European Search Report dated Jun. 6, 2023 issued in EP 23150811.0 (8 pages).
European Search Report; European Patent Office; European Application No. 23150809.4-1202 / 4221461; Oct. 12, 2023; 9 pages.
Office Action mailed Mar. 13, 2025 for U.S. Appl. No. 17/571,772 with double-patenting rejections on pp. 3-9.

* cited by examiner

HEATING ELEMENT UNIT

TECHNICAL FIELD

The present disclosure relates to heating element units, suitable for use in electrical resistance heaters, electrical resistance heaters comprising such heating element units, and methods of manufacturing heating element units.

BACKGROUND

A typical electrical resistance heater comprises a heating element (e.g. a wire) with high electrical resistivity which is surrounded by a heat conducting dielectric material, enclosed within a casing. As an electrical current is passed through the heating element, heat is generated. The surrounding dielectric material transfers the heat to the casing and to the surroundings, thereby providing a heating effect. Magnesium oxide (MgO) is commonly used as the heat conducting dielectric material in electrical resistance heaters. However, existing electrical resistance heaters may not be suitable for use in higher-voltage applications. It may therefore be desirable to provide an improved arrangement.

SUMMARY

According to a first aspect, there is provided a heating element unit for an electric resistance heater, the heating element unit comprising: a casing; a heating element within the casing; an electrical supply pin in electrical contact with the heating element; an electrically insulating filler between the heating element and the casing; and an electrically insulating barrier provided between portions of the heating element, the electrical supply pin and/or the casing, the electrically insulating barrier having a greater dielectric strength than the electrically insulating filler, wherein the dielectric strength of the electrically insulating barrier is greater than about 1500 kV/m (greater than about 40 V/mil).

According to a second aspect, there is provided a method of manufacturing a heating element unit according to the first aspect, the method comprising: providing the heating element within the casing; providing the electrical supply pin in electrical contact with the heating element; providing the electrically insulating filler between the heating element and the casing; and providing the electrically insulating barrier within the casing between portions of the heating element, the electrical supply pin and/or the casing.

According to a third aspect, there is provided an electric resistance heater comprising a heating element unit according to the first aspect.

The details, examples and preferences provided in relation to any particular one or more of the stated aspects will be further described herein and apply equally, mutatis mutandis, to all aspects. Any combination of the embodiments, examples and preferences described herein in all possible variations thereof is encompassed by the present disclosure unless otherwise indicated herein, or otherwise clearly contradicted by context.

The present invention is based on the surprising and advantageous finding that by using an electrically insulating barrier in a heating element unit (which additionally includes an electrically insulating filler) between portions of a heating element, an electrical supply pin and/or a casing, the dielectric strength of the electrically insulating barrier being greater than about 1500 kV/m (greater than about 40 V/mil) and greater than the dielectric strength of the electrically insulating filler, the heating element unit may be operated at higher voltages without a concomitant increase in size of the heating element unit, or the size of the heating element unit may be reduced without a concomitant reduction in the operating voltage.

Heating Element Unit

There is provided herein a heating element unit for an electric resistance heater, the heating element unit comprising: a casing; a heating element within the casing; an electrical supply pin in electrical contact with the heating element; an electrically insulating filler between the heating element and the casing; and an electrically insulating barrier provided between portions of the heating element, the electrical supply pin and/or the casing. The electrically insulating barrier has a greater dielectric strength than the electrically insulating filler, and the dielectric strength of the electrically insulating barrier is greater than about 1500 kV/m (greater than about 40 V/mil).

The heating element may be a coil. The heating element may comprise (e.g. be) a wire. The heating element may comprise (e.g. be) a strip of wire. The heating element may comprise (e.g. be) a ribbon, for example, a straight or corrugated ribbon. The heating element may comprise (e.g. be) a coil. The coil may be formed from the wire, strip of wire, or the ribbon, i.e. the wire, strip of wire or the ribbon may be coiled.

The heating element may have a high electrical resistivity. The heating element may have an electrical resistivity of no less than about 0.90 $\Omega mm^2/m$ (540 Ω/cmf) and no greater than about 1.60 $\Omega mm^2/m$ (960 Ω/cmf). The heating element may have an electrical resistivity no less than about 1.00 $\Omega mm^2/m$ (600 Ω/cmf) and no greater than about 1.50 $\Omega mm^2/m$ (900 Ω/cmf). The heating element may have an electrical resistivity no less than about 1.00 $\Omega mm^2/m$ (600 Ω/cmf) and no greater than about 1.20 $\Omega mm^2/m$ (720 Ω/cmf).).

The heating element may be formed from a metal or metal alloy such as a nickel-chromium (NiCr) alloy. The heating element may be formed from Nikrothal® 80, available from Kanthal AB, Sweden. The heating element may have an electrical resistivity of about 1.09 $\Omega mm^2/m$ (654 Ω/cmf).

The heating element may extend along a length of the heating element unit (i.e. within the casing). The heating element may extend along substantially the majority of the length of the heating element unit. The heating element may extend along the entire length of the heating element unit.

The heating element (e.g. the wire, strip of wire, ribbon or coil) may extend in a substantially straight line through the casing. The heating element (e.g. the wire, strip of wire, ribbon or coil) may be bent within the casing. The heating element (e.g. the wire, strip of wire, ribbon or coil) may follow a curved path within the casing. For example, the heating element (e.g. the wire, strip of wire, ribbon or coil) may bend through 180° within the casing so that two substantially parallel heating element sections are formed within the casing. That is to say, the heating element (e.g. the wire, strip of wire, ribbon or coil) may traverse the (e.g. majority of the) length of the heating element unit twice. The heating element (e.g. the wire, strip of wire, ribbon or coil) may comprise more than two such substantially parallel heating element sections. That is to say, the heating element (e.g. the wire, strip of wire, ribbon or coil) may traverse the (e.g. majority of the) length of the heating element unit more than two times.

The heating element may be spaced apart from the casing, i.e. such that the heating element does not make electrical contact with the casing. The heating element may be spaced apart from the casing by the electrically insulating filler and/or the electrically insulating barrier. The heating element may be spaced apart from the casing by the electrically insulating filler and/or the electrically insulating barrier in more than one location. The heating element may be surrounded by the electrically insulating filler and/or the electrically insulating barrier. The heating element may be completely surrounded by the electrical electrically insulating filler and/or the electrically insulating barrier. The electrically insulating filler and/or the electrically insulating barrier may extend along substantially the entire length of heating element unit and/or the heating element.

The electrically insulating filler and/or the electrically insulating barrier may be both electrically insulating and heat conducting. The electrically insulating filler and/or the electrically insulating barrier may comprise (e.g. consist of, consist essentially of or be formed from) a dielectric material. The electrically insulating filler and/or the electrically insulating barrier may be surrounded by the casing. As a current is passed through the heating element, heat may be generated. The surrounding electrically insulating filler and/or the electrically insulating barrier may transfer heat from the heating element to the casing (and thus to the surroundings), thereby providing a heating effect.

The electrically insulating filler and/or the electrically insulating barrier may have a higher electrical resistance than the heating element.

The casing may be a sheath. The casing may be metallic (i.e. formed from a metal or metal alloy). The casing may be tubular.

The heating element unit includes at least one electrical supply pin in electrical contact with the heating element. The at least one electrical supply pin may supply current to the heating element. The electrical supply pin may have terminal ends for connection to a device and/or electrical wiring, for example, for connection to a power supply.

The heating element unit may include at least first and second electrical supply pins, the first electrical supply pin being in electrical contact with a first end of the heating element and the second electrical supply pin being in electrical contact with a second, opposing end of the heating element. The first and second ends of the heating element, and thus the first and second electrical supply pins, may be located at opposing ends of the heating element unit (e.g. opposing ends of the casing). Alternatively, for example in embodiments in which the heating element is bent within the casing, the first and second ends of the heating element, and thus the first and second electrical supply pins, may be located at the same end of the heating element unit (e.g. the same end of the casing). The electrically insulating filler and/or the electrically insulating barrier may surround at least a portion of the at least one electrical supply pin or at least a portion of each of the first and second electrical supply pins.

The heating element unit may be provided in an electric resistance heater, wherein the electrical supply pins of the heating element unit are connected to a power supply.

Arrangement of Electrically Insulating Barrier

The portions of the heating element, the electrical supply pin and/or the casing between which the electrically insulating barrier is provided may be proximate or nearby portions. That is to say, the portions of the heating element, the electrical supply pin and/or the casing between which the electrically insulating barrier is provided may be proximate or nearby one another.

More particularly, the portions of the heating element, the electrical supply pin and/or the casing between which the electrically insulating barrier is provided may be adjacent portions. That is to say, the electrically insulating barrier may be provided between adjacent portions of the heating element, the electrical supply pin and/or the casing.

Adjacent portions of two components (i.e. the heating element, the electrical supply pin and/or the casing) of the heating element unit may be immediately adjacent portions of said two components, that is to say portions which are located in the same region of the heating element unit (e.g. along its length) and are therefore proximate one another. Adjacent portions of two components (i.e. the heating element, the electrical supply pin and/or the casing) of the heating element unit may be portions of the said components which are both intersected by a (hypothetical) line or plane drawn through the heating element unit perpendicular to a longitudinal axis of the heating element unit, that is to say, the adjacent portions of the two components are immediately adjacent one another in a cross-section of the heating element unit perpendicular to the longitudinal axis of the heating element unit. Adjacent portions of two components (i.e. the heating element, the electrical supply pin and/or the casing) of the heating element unit may therefore be portions of the said two components which are the shortest distance apart, in the sense that if one identifies a first portion of a first component, then an adjacent second portion of a second component is the portion of the second component which is closest to the first portion of the first component measured in a radial direction, i.e. perpendicular to the longitudinal axis of the heating element unit. Thus, the portions of the heating element, the electrical supply pin and/or the casing between which the electrically insulating barrier is provided may be adjacent portions in the radial direction.

The portions of the heating element, the electrical supply pin and/or the casing between which the electrically insulating barrier is provided may be corresponding portions of heating element, the electrical supply pin and/or the casing at a certain position along the length of the heating element unit.

The portions of the heating element, the electrical supply pin and/or the casing between which the electrically insulating barrier is provided may be spaced apart from one another (i.e. in a radial direction). The portions of the heating element, the electrical supply pin and/or the casing between which the electrically insulating barrier is provided may be spaced apart from one another only by the electrically insulating barrier and, optionally, the electrically insulating filler.

In some embodiments, the electrically insulating barrier is provided between (e.g. proximate, nearby, adjacent, immediately adjacent or corresponding) portions of the heating element and the casing (i.e. a portion of the heating element and a portion of the casing).

In some embodiments, the electrically insulating barrier is provided between (e.g. proximate, nearby, adjacent, immediately adjacent or corresponding) of the electrical supply pin and the casing (i.e. a portion of the electrical supply pin and a portion of the casing).

In some embodiments, the electrically insulating barrier is provided between (e.g. proximate, nearby, adjacent, immediately adjacent or corresponding) two different portions of the heating element.

In some embodiments, the electrical supply pin is a first electrical supply pin provided at a first end of the heating element unit where the first electrical supply pin is in electrical contact with the heating element and the heating element unit comprises a second electrical supply pin provided at a second, opposing end of the heating element unit where the second electrical supply pin is in electrical contact with the heating element. The heating element may extend between the first and second ends of the heating element unit. In such embodiments, the electrically insulating barrier may be provided between (e.g. proximate, nearby, adjacent, immediately adjacent or corresponding) portions of the heating element and the casing (i.e. between a portion of the heating element and a portion of the casing), between (e.g. proximate, nearby, adjacent, immediately adjacent or corresponding) portions of the first electrical supply pin and the casing (i.e. between a portion of the first electrical supply pin and a portion of the casing), and/or between (e.g. proximate, nearby, adjacent, immediately adjacent or corresponding) portions of the second electrical supply pin and the casing (i.e. between a portion of the second electrical supply pin and a portion of the casing).

In some embodiments, the electrical supply pin is a first electrical supply pin provided at a first end of the heating element unit where the first electrical supply pin is in electrical contact with the heating element and the heating element unit comprises a second electrical supply pin also provided at said first end of the heating element unit where the second electrical supply pin is also in electrical contact with the heating element (for example, in embodiments in which the heating element bends within the casing). The heating element may comprise at least first and second (e.g. substantially parallel) sections spaced apart from one another. In such embodiments, the electrically insulating barrier may be provided between (e.g. proximate, nearby, adjacent, immediately adjacent or corresponding) portions of the at least first and second sections of the heating element (i.e. between a portion of the first section and a portion of the second section), between (e.g. proximate, nearby, adjacent, immediately adjacent or corresponding) portions of the first and second electrical supply pins (i.e. between a portion of the first electrical supply pin and a portion of the second electrical supply pin), between (e.g. proximate, nearby, adjacent, immediately adjacent or corresponding) portions of the first electrical supply pin and the casing (i.e. between a portion of the first electrical supply pin and a portion of the casing), between (e.g. proximate, nearby, adjacent, immediately adjacent or corresponding) portions of the second electrical supply pin and the casing (i.e. between a portion of the second electrical supply pin and a portion of the casing), and/or between (e.g. proximate, nearby, adjacent, immediately adjacent or corresponding) portions of the heating element and the casing (i.e. between a portion of the heating element and a portion of the casing).

In some embodiments, the heating element is a first heating element and the heating element unit further comprises a second heating element. The first heating element and the second heating element may be spaced apart from one another. Therefore, the first heating element and the second heating element may not be in electrical connection with one another, i.e. such that the first and second heating elements are electrically isolated from one another. In such embodiments, the electrically insulating barrier may be provided between (e.g. proximate, nearby, adjacent, immediately adjacent or corresponding) portions of the first and second heating elements (e.g. between a portion of the first heating element and a portion of the second heating element).

In some embodiments, the heating element unit comprises three or more heating elements including the first and second heating elements. In such embodiments, the electrically insulating barrier may be provided between (e.g. proximate, nearby, adjacent, immediately adjacent or corresponding) portions of any two or more of the three or more heating elements.

The electrically insulating barrier may extend along at least a portion of a length of the heating element unit. The electrically insulating barrier may extend substantially parallel to a longitudinal axis of the heating element unit. The barrier may be elongate. The barrier may be elongate in a longitudinal direction of the heating element unit.

In some embodiments, the electrically insulating barrier has a substantially rectangular shape in cross-section in a plane perpendicular to the longitudinal axis. For example, the electrically insulating barrier may have an oblong shape in cross-section in a plane perpendicular to the longitudinal axis. For example, the electrically insulating barrier may be substantially cuboidal in shape. A minor dimension of the rectangular (e.g. oblong) cross-section may be substantially smaller than a major dimension of the rectangular (e.g. oblong) cross-section. For example, the electrically insulating barrier may be provided in the form of a panel or a sheet.

In some embodiments, the electrically insulating barrier comprises a plurality of electrically insulating barrier wall portions when viewed in cross-section in a plane perpendicular to the longitudinal axis. The electrically insulating barrier wall portions may be connected to one another.

The electrically insulating barrier wall portions may be arranged radially around the longitudinal axis. The electrically insulating barrier wall portions may be arranged regularly, e.g. (rotationally) symmetrically around the longitudinal axis.

The electrically insulating barrier wall portions may be arranged so as to radiate from the longitudinal axis. For example, the plurality of electrically insulating barrier wall portions may be arranged in a cross or star (e.g. starlike) configuration. For example, the electrically insulating barrier may have a X-shaped cross-section in the plane perpendicular to the longitudinal axis.

In some embodiments, the electrically insulating barrier extends between first and second longitudinal ends, and the electrically insulating barrier tapers (i.e. in width and/or thickness) in a radial direction towards the first end.

The electrically insulating barrier may be insertable into the casing in an insertion direction, wherein the first end of the electrically insulating barrier is the first part of the electrically insulating barrier to be inserted into the casing in the insertion direction. The first part of the electrically insulating barrier to be inserted into the casing may be tapered relative to the second longitudinal end. In this way, the barrier may be easily insertable into the casing.

The electrically insulating barrier may extend along substantially the entire length of the casing and/or the heating element unit. Alternatively, the electrically insulating barrier may extend along no more than a length of the electrical supply pin, or along no more than the length of the electrical supply pin and at least part of the length of the heating element, or along no greater than about 50%, for example, no greater than about 25%, or no greater than about 10%, of the length of the casing and/or the heating element unit.

The electrically insulating barrier may be a preformed insert.

The electrically insulating barrier may be solid. The electrically insulating barrier may be unitary, i.e. a unitary component of the heating element unit. The electrically insulating barrier may be monolithic. The electrically insulating barrier may be non-granular, e.g. formed of a non-granular material, or formed from one or more granular materials which have been compacted and/or bonded to form a solid mass.

The (e.g. chemical) composition of the electrically insulating barrier may be different from the (e.g. chemical) composition of the electrically insulating filler, i.e. such that the electrically insulating barrier has a higher dielectric strength than the electrically insulating filler. For example, the electrically insulating barrier may comprise (e.g. be formed from, consist of or consist essentially of) one or more different materials from the electrically insulating filler such that the electrically insulating barrier has a higher dielectric strength than the electrically insulating filler. Additionally or alternatively, the electrically insulating barrier and the electrically insulating filler may comprise one or more materials in common, said one or more materials being present in different amounts (e.g. concentrations) such that that the electrically insulating barrier has a higher dielectric strength than the electrically insulating filler.

The electrically insulating barrier may comprise (e.g. be formed from, consist of or consist essentially of) one or more of: a metal oxide such as an alkaline earth metal oxide other than magnesium oxide (MgO), for example, beryllium oxide (BeO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite or mica; a glass such as soda-lime glass, borosilicate glass or aluminosilicate glass; a ceramic; a glass ceramic such as a machinable glass ceramic; a polymer such a fluoropolymer, for example, polytetrafluoroethylene (PTFE), or a silicone.

It will be appreciated that the term "metal oxide" encompasses oxides of a single metal element (e.g. BeO) as well as oxides of two or more different metal elements (e.g. NiWO), including doped oxides or oxides having non-stochiometric compositions.

The term "alkaline earth metal oxide" refers to oxides including one or more alkaline earth metal elements. The alkaline earth metal elements include beryllium (Be), magnesium MgO), calcium (Ca), strontium (Sr), barium (Ba) and radium (Ra).

The term "transition metal oxide" refers to oxides including one or more transition metal elements. The transition metal elements include scandium (Sc), titanium (Ti), vanadium (V), chromium (Cr), manganese (Mn), iron (Fe), cobalt (Co), nickel (Ni), copper (Cu), yttrium (Y), zirconium (Zr), niobium (Nb), molybdenum (Mo), technetium (Tc), ruthenium (Ru), rhodium (Rh), palladium (Pd), silver (Ag), hafnium (Hf), tantalum (Ta), tungsten (W), rhenium (Re), osmium (Os), iridium (Ir), platinum (Pt) and gold (Au).

The term "post transition metal oxide" refers to oxides including one or more post transition metal elements. The post transition metal elements include zinc (Zn), cadmium (Cd), mercury (Hg), aluminium (Al), gallium (Ga), indium (In), thallium (T), tin (Sn), lead (Pb), bismuth (Bi), germanium (Ge), antimony (Sb) and polonium (Po).

The term "Group 13 nitride" refers to a nitride of an element in Group 13 of the periodic table of elements, which includes boron (B), aluminium (Al), gallium (Ga), indium (In) and thallium (Tl).

The term "Group 14 nitride" refers to a nitride of an element in Group 14 of the periodic table of elements, which includes carbon (C), silicon (Si), germanium (Ge), tin (Sn) and lead (Pb).

The term "silicate mineral" refers to minerals comprising ionic compounds whose anions consist essentially of silicon and oxygen atoms, for example, in the form of orthosilicates, metasilicates or pyrosilicates. The silicate minerals include nesosilicate minerals, sorosilicate minerals, cyclosilicate minerals, inosilicate minerals, phyllosilicate minerals and tectosilicate minerals. For the purposes of this specification and claims, the silicate minerals also include silica ($SiO_2$), as is common in the field of mineralogy.

The term "aluminium silicate" refers to minerals composed of aluminium, silicon and oxygen, which are derived from aluminium oxide ($Al_2O_3$) and silicon dioxide ($SiO_2$) and which may be anhydrous or hydrated, naturally-occurring or synthetic. Their chemical formulae may be expressed as xAl2O3·ySiO2·zH2O.

The term "aluminosilicate mineral" refers to minerals composed of aluminium, silicon and oxygen, plus optional countercations, and may be anhydrous or hydrated. The aluminosilicate minerals include andalusite, kyanite, sillimanite, kaolinite, metakaolinite and mullite.

The term "phyllosilicate mineral" refers to silicate minerals which include parallel sheets of silicate tetrahedra with $Si_2O_5$ in a 2:5 ratio. The phyllosilicate minerals include the serpentine group minerals, the clay group minerals and the mica group minerals (i.e. "mica"). The mica group minerals include biotite, fuchsite, muscovite, phlogopite, lepidolite, margarite and glauconite.

For the avoidance of doubt, the term "mineral" as used herein encompasses both naturally-occurring minerals and synthetic minerals, including surface-treated or coated minerals.

The term "glass" refers to a non-crystalline, amorphous material, typically formed by rapid cooling of a melt, which may be synthetic or natural occurring. Glasses include silicate glasses which are formed predominantly from $SiO_2$. Silicate glasses include soda-lime glass (silicate glass including sodium carbonate ($Na_2CO_3$) and lime (CaO), typically also magnesium oxide (MgO) and aluminium oxide ($Al_2O_3$)), borosilicate glass (silicate glass including boron trioxide ($B_2O_3$) and aluminosilicate glass (silicate glass including alumina ($Al_2O_3$)).

The term "ceramic" refers to inorganic, non-metallic materials comprising metal, non-metal or metalloid atoms primarily held in ionic and covalent bonds. Ceramics are commonly based on oxides, nitrides, borides or carbides.

The term "glass ceramic" refers to materials containing both non-crystalline glass and crystalline ceramic phases, typically formed by controlled nucleation and partial crystallisation of a base glass through heat treatment. Glass ceramics may be based on the LAS ($Li_2O \times Al_2O_3 \times nSiO_2$), MAS ($MgO \times Al_2O_3 \times nSiO_2$) or ZAS ($ZnO \times Al_2O_3 \times nSiO_2$) systems. Glass ceramics include machinable glass ceramics, which are glass ceramics having suitable mechanical properties for machining, such as Macor® available from Corning Inc., USA.

The term "polymer" encompasses synthetic and natural polymers made from any suitable monomers, and includes fluoropolymers (i.e. polymers made from fluorocarbon monomers) such as PTFE and silicones (i.e. polymerised siloxanes) such as silicone rubber.

The term "mineral" as used herein encompasses both naturally-occurring minerals and synthetic mineral-like products.

The electrically insulating barrier may comprise (e.g. be formed from, consist of or consist essentially of) one or more of: a metal oxide such as an alkaline earth metal oxide other than magnesium oxide (MgO), for example, beryllium oxide (BeO), a transition metal oxide, for example, zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate mineral such as mullite; or a glass ceramic such as a machinable glass ceramic. These materials may have a dielectric strength no less than about 7800 kV/m and no greater than about 39000 kV/m.

The electrically insulating barrier may comprise (e.g. be formed from, consist of or consist essentially of) one or more of: a transition metal oxide, for example, zirconium dioxide ($ZrO_2$), or hafnium dioxide ($HfO_2$); a nitride such as a Group 13 nitride, for example, boron nitride (BN) or aluminium nitride (AlN), or a Group 14 nitride, for example, silicon nitride (SiN); or a glass ceramic such as a machinable glass ceramic. These materials may have a dielectric strength no less than about 15000 kV/m and no greater than about 39000 kV/m.

The electrically insulating barrier may comprise (e.g. be formed from, consist of or consist essentially of) one or more of: a transition metal oxide, for example, zirconium dioxide ($ZrO_2$), or hafnium dioxide ($HfO_2$); a nitride such as a Group 13 nitride, for example, boron nitride (BN), or a glass ceramic such as a machinable glass ceramic. These materials may have a dielectric strength no less than about 23000 kV/m and no greater than about 39000 kV/m.

The electrically insulating barrier may comprise (e.g. be formed from, consist of or consist essentially of) one or more materials having a melting point no less than about 1000° C., for example, no less than about 2000° C., or no less than about 3000° C. For example, the second layer may have a melting point no less than about 1000° C., for example, no less than about 2000° C., or no less than about 3000° C.

It will be understood that the term "melting point" refers to the temperature at which a substance changes from a solid to a liquid. The term "melting point" as used in the present specification and claims refers to the melting point as measured at atmospheric pressure. It will be appreciated that some substances (e.g. chemical mixtures) melt across a range of temperatures between a solidus temperature, below which the substance is completely solid, and a liquidus temperature, above which the substance is completely liquid. For such substances, references to "melting point" herein shall be interpreted as references to the solidus temperature, i.e. the temperature at which melting of the substance begins.

The electrically insulating barrier may comprise (e.g. be formed from, consist of or consist essentially of) one or more of: a metal oxide such as an alkaline earth metal oxide other than magnesium oxide (MgO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); or a silicate, aluminium silicate, aluminosilicate or phyllosilicate mineral such as mullite. These materials may have a melting point no less than about 1000° C.

The electrically insulating barrier may comprise (e.g. be formed from, consist of or consist essentially of) one or more of: a metal oxide such as an alkaline earth metal oxide other than magnesium oxide (MgO), a transition metal oxide, for example, zirconium dioxide ($ZrO_2$), or hafnium dioxide ($HfO_2$), or a post transition metal oxide, for example, aluminium oxide ($Al_2O_3$); or a nitride such as a Group 13 nitride, for example, boron nitride (BN) or aluminium nitride (AlN). These materials may have a melting point no less than about 2000° C.

The electrically insulating barrier may comprise (e.g. be formed from, consist of or consist essentially of) a nitride such as a Group 13 nitride, for example, boron nitride (BN). This material may have a melting point no less than about 3000° C.

The electrically insulating barrier may comprise (e.g. be formed from, consist of or consist essentially of) one or more materials having a thermal conductivity no less than about 3 W/mK, for example, no less than about 10 W/mK, or no less than about 100 W/mK. For example, the electrically insulating barrier may have a thermal conductivity no less than about 3 W/mK, for example, no less than about 10 W/mK, or no less than about 100 W/mK.

It will be understood that the term "thermal conductivity" is the ability of a material to conduct heat, and it represents the quantity of thermal energy that flows per unit time through a unit area with a temperature gradient of 1° per unit distance, for example, measured according to ASTM C177 or C518.

The electrically insulating barrier may comprise (e.g. be formed from, consist of or consist essentially of) one or more of: a metal oxide such as an alkaline earth metal oxide other than magnesium oxide (MgO), for example, beryllium oxide (BeO), a transition metal oxide, for example, titanium dioxide ($TiO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite. These materials may have a thermal conductivity no less than about 3 W/mK.

The electrically insulating barrier may comprise (e.g. be formed from, consist of or consist essentially of) one or more of: a metal oxide such as an alkaline earth metal oxide other than magnesium oxide (MgO), for example, beryllium oxide (BeO), a transition metal oxide, for example, titanium dioxide ($TiO_2$), or hafnium dioxide ($HfO_2$), or a post transition metal oxide, for example, aluminium oxide ($Al_2O_3$); or a nitride such as a Group 13 nitride, for example, boron nitride (BN) or aluminium nitride (AlN), or a Group 14 nitride, for example, silicon nitride (SiN). These materials may have a thermal conductivity no less than about 10 W/mK.

The electrically insulating barrier may comprise (e.g. be formed from, consist of or consist essentially of) one or more of: a metal oxide such as an alkaline earth metal oxide other than magnesium oxide (MgO), for example, beryllium oxide (BeO) or a nitride such as a Group 13 nitride, for example, aluminium nitride (AlN). These materials may have a thermal conductivity no less than about 100 W/mK.

The electrically insulating barrier may comprise (e.g. be formed from, consist of or consist essentially of) one or more materials having an electrical resistivity no less than about 100000 MΩm, for example, no less than about 1000000 MΩm, or no less than about 2000000 MΩm. For example, the electrically insulating barrier may have an electrical resistivity no less than about 100000 MΩm, for example, no less than about 1000000 MΩm, or no less than about 2000000 MΩm.

It will be understood that the term "electrical resistivity" (also referred to as "specific electrical resistance" or "volume resistivity") is a fundamental property of a material that measures how strongly it resists electric current. Electrical resistivity may be determined by measuring the electrical resistance, for example using an ohmmeter, according to ASTM D257.

The electrically insulating barrier may comprise (e.g. be formed from, consist of or consist essentially of) one or more of: a metal oxide such as an alkaline earth metal oxide other than magnesium oxide (MgO), for example, beryllium oxide (BeO), a transition metal oxide, for example, titanium dioxide ($TiO_2$), zirconium dioxide ($ZrO_2$), or hafnium dioxide ($HfO_2$), or a post transition metal oxide, for example, aluminium oxide (Al2O3); a nitride such as a Group 13 nitride, for example, boron nitride (BN) or aluminium nitride (AlN); a silicate, aluminium silicate, aluminosilicate or phyllosilicate mineral such as mullite; a glass ceramic such as a machinable glass ceramic. These materials may have an electrical resistivity no less than about 100000 MΩm.

The electrically insulating barrier may comprise (e.g. be formed from, consist of or consist essentially of) one or more of: a metal oxide such as an alkaline earth metal oxide other than magnesium oxide (MgO), for example, beryllium oxide (BeO), a transition metal oxide, for example, zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN); a silicate, aluminium silicate, aluminosilicate or phyllosilicate mineral such as mullite; a glass ceramic such as a machinable glass ceramic. These materials may have an electrical resistivity no less than about 1000000 MΩm.

The electrically insulating barrier may comprise (e.g. be formed from, consist of or consist essentially of) one or more of: a metal oxide such as an alkaline earth metal oxide other than magnesium oxide (MgO), or a transition metal oxide, for example, hafnium dioxide ($HfO_2$); or a nitride such as a Group 13 nitride, for example, boron nitride (BN). These materials may have an electrical resistivity no less than about 2000000 MΩm.

In some embodiments, the electrically insulating barrier is an electrically insulating sleeve, for example a preformed electrically insulating sleeve.

The electrically insulating sleeve may be preformed into shape. During manufacture of the heating element unit, the electrically insulating sleeve may be applied to, for example, placed around, the heating element, for example the pin, coil, wire or ribbon, and/or the electrical supply pin. The electrically insulating sleeve may be applied to, for example, placed adjacent the casing (e.g. sheath), for example on an internal side of the casing (e.g. sheath).

The electrically insulating sleeve may comprise (e.g. be formed from, consist of or consist essentially of) one or more of: a silicate, aluminium silicate, aluminosilicate or phyllosilicate mineral such as mica; a glass such as soda-lime glass, borosilicate glass or aluminosilicate glass; a ceramic; a glass ceramic such as a machinable glass ceramic; a polymer such a fluoropolymer, for example, polytetrafluoroethylene (PTFE), or a silicone. The sleeve may comprise (e.g. be formed from, consist of or consist essentially of) a polymeric material.

The electrically insulating filler may comprise (e.g. be formed from, consist of or consist essentially of) granular magnesium oxide (MgO) and the electrically insulating barrier may be a preformed insert formed from a material having a greater dielectric strength than magnesium oxide (MgO), the barrier being provided between portions of the heating element, the electrical supply pin and/or the casing.

The electrically insulating barrier may be formed from one or more granular materials which have been compacted and/or bonded to form a unitary (e.g. single), discrete mass.

In some embodiments, the electrically insulating sleeve surrounds at least a portion of the heating element and/or at least a portion of the electrical supply pin and is closer to the said at least a portion of the heating element and/or at least a portion of the electrical supply pin than to the casing. In some embodiments, the electrically insulating sleeve encloses at least a portion of the heating element and/or at least a portion of the electrical supply pin and is closer to the said at least a portion of the heating element and/or at least a portion of the electrical supply pin than to the casing. In some embodiments, the electrically insulating sleeve is adjacent to at least a portion of the heating element and/or at least a portion of the electrical supply pin and is closer to the said at least a portion of the heating element and/or at least a portion of the electrical supply pin than to the casing. In some embodiments, the electrically insulating sleeve directly contacts at least a portion of the heating element and/or at least a portion of the electrical supply pin and is closer to the said at least a portion of the heating element and/or at least a portion of the electrical supply pin than to the casing.

In some embodiments, the electrically insulating sleeve is closer to the casing than to the heating element and/or the electrical supply pin. In some embodiments, the electrically insulating sleeve is surrounded by the casing. In some embodiments, the electrically insulating sleeve is adjacent to the casing. In some embodiments, the electrically insulating sleeve directly contacts the casing.

In some embodiments, the electrically insulating barrier is a coating. The coating may be a coating on the heating element, for example, on a coil, wire or ribbon, and/or on the electrical supply pin. Alternatively, the coating may be a coating on the casing (e.g. sheath). For example, the coating may be a coating on an internal side of the casing (e.g. sheath), such as the side of the casing (e.g. sheath) which is closest to the heating element and/or the electrical supply pin. The coating may be applied by spraying or painting.

The coating may be a ceramic-based coating or a polymer-based coating such as an epoxy resin, thermoplastic or thermoset polymer, a silicone-based coating or a fluoropolymer-based coating. The ceramic-based coating may be formed from a commercially available coating material such as from the Cerakote®, Duracote® or Aluma-Hyde® or CeraGlide® product ranges.

Dielectric Strength of Electrically Insulating Barrier

The electrically insulating barrier may have a dielectric strength no less than about 1501 kV/m, for example, no less than about 2000 kV/m, or no less than about 3000 kV/m, or no less than about 4000 kV/m, or no less than about 5000 kV/m, or no less than about 6000 kV/m, or no less than about 7000 kV/m, or no less than about 7800 kV/m, or no less than about 10000 kV/m, or no less than about 15000 kV/m, or no less than about 20000 kV/m, or no less than about 23000 kV/m.

The electrically insulating barrier may have a dielectric strength no greater than about 1000000 kV/m, for example, no greater than about 500000 kV/m, or no greater than about 250000 kV/m, or no greater than about 100000 kV/m, or no greater than about 50000 kV/m, or no greater than about 40000 kV/m, or no greater than about 39000 kV/m, or no greater than about 30000 kV/m, or no greater than about 20000 kV/m, or no greater than about 10000 kV/m.

The electrically insulating barrier may have a dielectric strength greater than about 1500 kV/m (e.g. no less than about 1501 kV/m) and no greater than about 1000000 kV/m, for example, greater than about 1500 kV/m (e.g. no less than about 1501 kV/m) and no greater than about 500000 kV/m, or greater than about 1500 kV/m (e.g. no less than about 1501 kV/m) and no greater than about 250000 kV/m, or greater than about 1500 kV/m (e.g. no less than about 1501 kV/m) and no greater than about 100000 kV/m, or greater than about 1500 kV/m (e.g. no less than about 1501 kV/m) and no greater than about 50000 kV/m, or greater than about 1500 kV/m (e.g. no less than about 1501 kV/m) and no greater than about 40000 kV/m, or greater than about 1500 kV/m (e.g. no less than about 1501 kV/m) and no greater than about 39000 kV/m, for example, no less than about 7800 kV/m and no greater than about 39000 kV/m, for example, no less than about 15000 kV/m and no greater than about 39000 kV/m, for example, no less than about 23000 kV/m and no greater than about 39000 kV/m.

The electrically insulating barrier may have a dielectric strength no less than about 6000 kV/m and no greater than about 1000000 kV/m, for example, no less than about 6000 kV/m and no greater than about 500000 kV/m, or no less than about 6000 kV/m and no greater than about 250000 kV/m, or no less than about 6000 kV/m and no greater than about 100000 kV/m, or no less than about 6000 kV/m and no greater than about 50000 kV/m, or no less than about 6000 kV/m and no greater than about 40000 kV/m, for example, no less than about 7800 kV/m and no greater than about 40000 kV/m, for example, no less than about 15000 kV/m and no greater than about 40000 kV/m, for example, no less than about 23000 kV/m and no greater than about 40000 kV/m.

The electrically insulating barrier may have a dielectric strength no less than about 7800 kV/m and no greater than about 1000000 kV/m, for example, no less than about 7800 kV/m and no greater than about 500000 kV/m, or no less than about 7800 kV/m and no greater than about 250000 kV/m, or no less than about 7800 kV/m and no greater than about 100000 kV/m, or no less than about 7800 kV/m and no greater than about 50000 kV/m, for example, no less than about 15000 kV/m and no greater than about 50000 kV/m, for example, no less than about 23000 kV/m and no greater than about 50000 kV/m.

The electrically insulating barrier may have a dielectric strength no less than about 15000 kV/m and no greater than about 1000000 kV/m, for example, no less than about 15000 kV/m and no greater than about 500000 kV/m, or no less than about 15000 kV/m and no greater than about 250000 kV/m, or no less than about 15000 kV/m and no greater than about 100000 kV/m, for example, no less than about 23000 kV/m and no greater than about 100000 kV/m.

It will be understood that the term “dielectric strength” (otherwise known as the “dielectric breakdown strength”) is measured as the voltage required to produce a dielectric breakdown through an electrically insulating material, i.e. the voltage at which the material loses its electrically insulating properties and current is able to flow. The dielectric strength can be determined for a certain piece of material and electrode separation, as the minimum applied electric field that results in dielectric breakdown (i.e. the applied voltage divided by electrode separation distance). Dielectric strength is measured in units of V/m (or equivalents thereof). Unless stated otherwise, references to dielectric strength of a material in the present specification and claims are references to dielectric strength as measured according to ASTM D149 or IEC 60243 at an ambient temperature (i.e. 25° C. (77° F.)).

The dielectric strength of an electrical insulator within the heating element unit can also be assessed using a dielectric withstand test, for example, using a HiPot tester such as the 3500D, 5500DT, 7550DT or 7620 HiPot testers available from Associated Research, Inc, USA. One lead of the tester is connected to the heating element and the other lead of the tester is connected to the casing. An AC voltage is then applied between the heating element and the casing for a fixed period of time and the current is measured. Dielectric withstand testing is typically carried out as a pass/fail test, where the AC voltage applied is calculated based on the voltage rating of the heating element unit and the time for which the test is to be carried out. A heating element unit will fail the test when the current detected is greater than a predetermined threshold value.

Dielectric withstand testing is commonly carried out for 1 second or for 1 minute. A heating element unit having a rated voltage of 120 V is tested at 1200 V (for the 1 second test) and 1000 V (for the 1 minute test), whereas a heating element unit having a rated voltage of 480 V is tested at 2352 V (for the 1 second test) and 1960 V (for the 1 minute test).

Failure may be caused by reduced heating element-casing clearance, an off-centred heating element, contamination, poor repress, gaps or cavities, or reduced dielectric strength of the electrical insulator. Therefore, assuming that other factors are controlled for, the withstand test can be used to estimate the dielectric strength of the electrical insulator, for example, by ramping up the applied voltage until breakdown occurs. Withstand testing is generally carried out at room temperature.

Electrically Insulating Filler

The electrically insulating filler may be a base fill material. The electrically insulating filler may be a granular material. For example, the electrically insulating filler may be a powdered material (e.g. a powder). The electrically insulating filler may be an at least partially compacted granular material (e.g. a compacted granular material). The electrically insulating filler may be an at least partially sintered granular material (e.g. a sintered granular material).

In some embodiments, the electrically insulating filler has a dielectric strength of no greater than about 1500 kV/m (40 V/mil). In other embodiments, the electrically insulating filler has a dielectric strength greater than about 1500 kV/m (40 V/mil).

The electrically insulating filler may comprise (e.g. be formed from, consist of or consist essentially of) one or more of: a metal oxide such as an alkaline earth metal oxide, for example, magnesium oxide (MgO), or a post transition metal oxide, for example, aluminium oxide ($Al_2O_3$); a nitride such as a Group 13 nitride, for example, aluminium nitride (AlN), or a Group 14 nitride, for example, silicon nitride (SiN); or a silicate, aluminium silicate, aluminosilicate or phyllosilicate mineral such as mullite.

The electrically insulating filler may comprise magnesium oxide (MgO). The electrically insulating filler may comprise granular magnesium oxide (MgO). The electrically insulating filler may comprise no less than about 92 wt. % magnesium oxide (MgO). The electrically insulating filler may comprise no less than about 90 wt. % magnesium oxide (MgO). The electrically insulating filler may comprise no less than about 80 wt. % magnesium oxide (MgO). The electrically insulating filler may comprise no less than about 70 wt. % magnesium oxide (MgO). The electrically insulating filler may comprise no less than about 60 wt. % magnesium oxide (MgO). The electrically insulating filler may comprise no less than about 50 wt. % magnesium oxide (MgO). The electrically insulating filler may comprise no more than about 40 wt. % magnesium oxide (MgO). The electrically insulating filler may comprise no more than about 30 wt. % magnesium oxide (MgO). The electrically insulating filler may comprise no more than about 20 wt. % magnesium oxide (MgO). The electrically insulating filler may comprise no more than about 10 wt. % magnesium oxide (MgO).

The electrically insulating filler may have a dielectric strength of no greater than about 1500 kV/m (40 V/mil). A compacted granular magnesium oxide may have a dielectric strength of about 1500 kV/m (40V/mil). The electrically insulating filler may have a dielectric strength of no greater than about 2900 kV/m (75 V/mil). A preformed and compressed granular magnesium oxide may have a dielectric strength of about 2900 kV/m (75 V/mil). The electrically insulating filler may have a dielectric strength of no greater than about 5900 kV/m (150 V/mil). The electrically insulating filler may have a dielectric strength of no greater than about 9800 kV/m (250 V/mil). A solid (i.e. non-granular) magnesium oxide may have a dielectric strength of no greater than about 5900 kV/m (150 V/mil), or no greater than about 9800 kV/m (250 V/mil).

It may be that the electrically insulating filler comprises (e.g. is formed from, consists of or consists essentially of) magnesium oxide (MgO) and the electrically insulating barrier has a dielectric strength greater than the dielectric strength of magnesium oxide (MgO). It may be the electrically insulating filler consists essentially of magnesium oxide (MgO) and the electrically insulating barrier has a dielectric strength greater than the dielectric strength of magnesium oxide (MgO), for example, wherein the electrically insulating barrier comprises (e.g. is formed from, consists of or consists essentially of) one or more materials having a dielectric strength greater than the dielectric strength of magnesium oxide (MgO).

The electrically insulating filler may form an inner insulating layer and the electrically insulating barrier may form an outer insulating layer. The electrically insulating filler may form an outer insulating layer and the electrically insulating barrier may form an inner insulating layer. The inner insulating layer may be arranged closer to the heating element and/or the electrical supply pin than the outer insulating layer. The inner insulator layer may be arranged radially inwards of the outer insulating layer. The inner insulator layer may surround the heating element and/or the electrical supply pin. The outer insulating layer may surround the inner insulating layer.

It may be that: the electrically insulating filler comprises (e.g. is formed from, consists of or consists essentially of) magnesium oxide (MgO); and the electrically insulating barrier comprises (e.g. is formed from, consists of or consists essentially of) one or more materials having a dielectric strength greater than the dielectric strength of magnesium oxide (MgO).

It may be that: the electrically insulating filler comprises (e.g. is formed from, consists of or consists essentially of) magnesium oxide (MgO); and the electrically insulating barrier comprises (e.g. is formed from, consists of or consists essentially of) a metal oxide such as an alkaline earth metal oxide other than magnesium oxide (MgO), for example, beryllium oxide (BeO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$), a nitride such as a Group 13 nitride, for example, boron nitride (BN) or aluminium nitride (AlN), or a Group 14 nitride, for example, silicon nitride (SiN), a silicate, aluminium silicate, aluminosilicate or phyllosilicate mineral such as mullite or mica, a glass such as soda-lime glass, borosilicate glass or aluminosilicate glass, a ceramic, a glass ceramic such as a machinable glass ceramic, and/or a polymer such a fluoropolymer, for example, polytetrafluoroethylene (PTFE), or a silicone.

The volume ratio of the electrically insulating filler to the electrically insulating barrier may be no less than about 25:1, or no less than about 20:1, or no less than about 15:1, or no less than about 10:1, or no less than about 5:1, or no less than about 3:1, or no less than about 2:1, or no less than about 1:1.

The volume ratio of the electrically insulating filler to the electrically insulating barrier may be no greater than about 1000:1, or no greater than about 800:1, or no greater than about 500:1, or no greater than about 300:1, or no greater than about 200:1, or no greater than about 100:1, or no greater than about 50:1, or no greater than about 25:1.

The volume ratio of the electrically insulating filler to the electrically insulating barrier may be no less than about 1:1 and no greater than about 1000:1, for example, no less than about 1:1 and no greater than about 800:1, or no less than about 1:1 and no greater than about 500:1, or no less than about 1:1 and no greater than about 300:1, or no less than about 1:1 and no greater than about 200:1, or no less than about 1:1 and no greater than about 100:1, or no less than about 1:1 and no greater than about 50:1, or no less than about 1:1 and no greater than about 25:1, or no less than about 2:1 and no greater than about 25:1, or no less than about 3:1 and no greater than about 25:1, or no less than about 5:1 and no greater than about 25:1, or no less than about 10:1 and no greater than about 25:1, or no less than about 15:1 and no greater than about 25:1, or no less than about 20:1 and no greater than about 25:1.

The volume ratio of the electrically insulating filler to the electrically insulating barrier may be no less than about 2:1 and no greater than about 1000:1, for example, no less than about 2:1 and no greater than about 800:1, or no less than about 2:1 and no greater than about 500:1, or no less than about 2:1 and no greater than about 300:1, or no less than about 2:1 and no greater than about 200:1, or no less than about 2:1 and no greater than about 100:1, or no less than about 2:1 and no greater than about 50:1, or no less than about 3:1 and no greater than about 50:1, or no less than about 5:1 and no greater than about 50:1, or no less than about 10:1 and no greater than about 50:1, or no less than about 15:1 and no greater than about 50:1, or no less than about 20:1 and no greater than about 50:1, or no less than about 25:1 and no greater than about 50:1.

The volume ratio of the electrically insulating filler to the electrically insulating barrier may be no less than about 3:1 and no greater than about 1000:1, for example, no less than about 3:1 and no greater than about 800:1, or no less than about 3:1 and no greater than about 500:1, or no less than about 3:1 and no greater than about 300:1, or no less than about 3:1 and no greater than about 200:1, or no less than about 3:1 and no greater than about 100:1, or no less than about 5:1 and no greater than about 100:1, or no less than about 10:1 and no greater than about 100:1, or no less than about 15:1 and no greater than about 100:1, or no less than about 20:1 and no greater than about 100:1, or no less than about 25:1 and no greater than about 100:1.

The volume ratio of the electrically insulating filler to the electrically insulating barrier may be no less than about 5:1 and no greater than about 1000:1, for example, no less than about 5:1 and no greater than about 800:1, or no less than about 5:1 and no greater than about 500:1, or no less than about 5:1 and no greater than about 300:1, or no less than about 5:1 and no greater than about 200:1, or no less than about 10:1 and no greater than about 200:1, or no less than about 15:1 and no greater than about 200:1, or no less than about 20:1 and no greater than about 200:1, or no less than about 25:1 and no greater than about 200:1.

The volume ratio of the electrically insulating filler to the electrically insulating barrier may be no less than about 10:1 and no greater than about 1000:1, for example, no less than about 10:1 and no greater than about 800:1, or no less than about 10:1 and no greater than about 500:1, or no less than about 10:1 and no greater than about 300:1, or no less than about 15:1 and no greater than about 300:1, or no less than about 20:1 and no greater than about 300:1, or no less than about 25:1 and no greater than about 300:1.

The volume ratio of the electrically insulating filler to the electrically insulating barrier may be no less than about 15:1 and no greater than about 1000:1, for example, no less than about 15:1 and no greater than about 800:1, or no less than about 15:1 and no greater than about 500:1, or no less than about 20:1 and no greater than about 500:1, or no less than about 25:1 and no greater than about 500:1.

The volume ratio of the electrically insulating filler to the electrically insulating barrier may be no less than about 20:1 and no greater than about 1000:1, for example, no less than about 20:1 and no greater than about 800:1, or no less than about 25:1 and no greater than about 800:1.

The volume ratio of the electrically insulating filler to the electrically insulating barrier may be no less than about 25:1 and no greater than about 1000:1, for example, no less than about 20:1 and no greater than about 800:1, or no less than about 25:1 and no greater than about 800:1.

The granular material may comprise a binder. The electrically insulating filler may comprise a binding material. The binding material may comprise a silicone, ceramic, glass powder, polymer or fluoropolymer.

The electrically insulating filler (e.g. the electrically-insulating granular material) may comprise no more than about 92 wt. % magnesium oxide, for example, no more than about 90 wt. % magnesium oxide, or no more than about 80 wt. % magnesium oxide, or no more than about 70 wt. % magnesium oxide, or no more than about 60 wt. % magnesium oxide, or no more than about 50 wt. % magnesium oxide, or no more than about 40 wt. % magnesium oxide, or no more than about 30 wt. % magnesium oxide, or no more than about 20 wt. % magnesium oxide, or no more than about 10 wt. % magnesium oxide, or no more than about 5 wt. % magnesium oxide. The electrical insulator (e.g. the electrically-insulating granular material) may be essentially free of magnesium oxide.

The electrically-insulating filler may have a dielectric strength greater than about 1500 kV/m (about 40 V/mil). The electrically-insulating filler may comprise a first electrically-insulating granular material. The electrically-insulating filler may further comprise a second electrically-insulating granular material different from the first electrically-insulating granular material.

The electrically-insulating filler (e.g. the first electrically insulating granular material) may comprise a first electrically insulating material having a dielectric strength no less than about 1501 kV/m, for example, no less than about 2000 kV/m, or no less than about 3000 kV/m, or no less than about 4000 kV/m, or no less than about 5000 kV/m, or no less than about 6000 kV/m, or no less than about 7000 kV/m, or no less than about 7800 kV/m, or no less than about 10000 kV/m, or no less than about 15000 kV/m, or no less than about 20000 kV/m, or no less than about 23000 kV/m.

The electrically-insulating filler (e.g. the first electrically-insulating granular material) may have a dielectric strength no less than about 6000 kV/m, for example, no less than about 7000 kV/m, or no less than about 7800 kV/m, or no less than about 10000 kV/m, or no less than about 15000 kV/m, or no less than about 20000 kV/m, or no less than about 23000 kV/m.

The electrically-insulating filler (e.g. the first electrically-insulating granular material) may have a dielectric strength no greater than about 1000000 kV/m, for example, no greater than about 500000 kV/m, or no greater than about 250000 kV/m, or no greater than about 100000 kV/m, or no greater than about 50000 kV/m, or no greater than about 40000 kV/m, or no greater than about 39000 kV/m, or no greater than about 30000 kV/m, or no greater than about 20000 kV/m, or no greater than about 10000 kV/m.

The electrically-insulating filler (e.g. the first electrically-insulating granular material) may have a dielectric strength greater than about 1500 kV/m and no greater than about 1000000 kV/m, for example, greater than about 1500 kV/m and no greater than about 500000 kV/m, or greater than about 1500 kV/m and no greater than about 250000 kV/m, or greater than about 1500 kV/m and no greater than about 100000 kV/m, or greater than about 1500 kV/m and no greater than about 50000 kV/m, or greater than about 1500 kV/m and no greater than about 40000 kV/m, or greater than about 1500 kV/m and no greater than about 39000 kV/m for example, no less than about 7800 kV/m and no greater than about 39000 kV/m, for example, no less than about 15000 kV/m and no greater than about 39000 kV/m, for example, no less than about 23000 kV/m and no greater than about 39000 kV/m.

The electrically-insulating filler (e.g. the first electrically-insulating granular material) may have a dielectric strength no less than about 6000 kV/m and no greater than about 1000000 kV/m, for example, no less than about 6000 kV/m and no greater than about 500000 kV/m, or no less than about 6000 kV/m and no greater than about 250000 kV/m, or no less than about 6000 kV/m and no greater than about 100000 kV/m, or no less than about 6000 kV/m and no greater than about 50000 kV/m, or no less than about 6000 kV/m and no greater than about 40000 kV/m, for example, no less than about 7800 kV/m and no greater than about 40000 kV/m, for example, no less than about 15000 kV/m and no greater than about 40000 kV/m, for example, no less than about 23000 kV/m and no greater than about 40000 kV/m.

The electrically-insulating filler (e.g. the first electrically-insulating granular material) may have a dielectric strength no less than about 7800 kV/m and no greater than about 1000000 kV/m, for example, no less than about 7800 kV/m and no greater than about 500000 kV/m, or no less than about 7800 kV/m and no greater than about 250000 kV/m, or no less than about 7800 kV/m and no greater than about 100000 kV/m, or no less than about 7800 kV/m and no greater than about 50000 kV/m, for example, no less than about 15000 kV/m and no greater than about 50000 kV/m, for example, no less than about 23000 kV/m and no greater than about 50000 kV/m.

The electrically-insulating filler (e.g. the first electrically-insulating granular material) may have a dielectric strength no less than about 15000 kV/m and no greater than about 1000000 kV/m, for example, no less than about 15000 kV/m and no greater than about 500000 kV/m, or no less than about 15000 kV/m and no greater than about 250000 kV/m, or no less than about 15000 kV/m and no greater than about 100000 kV/m, for example, no less than about 23000 kV/m and no greater than about 100000 kV/m.

The electrically-insulating filler (e.g. the first electrically-insulating granular material) may comprise (e.g. be formed from, consist of or consist essentially of) one or more of: a metal oxide such as an alkaline earth metal oxide, for example, beryllium oxide (BeO) or magnesium oxide (MgO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite or mica; a glass such as soda-lime glass, borosilicate glass or aluminosilicate glass; a ceramic; a glass ceramic such as a machinable glass ceramic; a polymer such a fluoropolymer, for example, polytetrafluoroethylene (PTFE), or a silicone.

The electrically-insulating filler (e.g. the first electrically-insulating granular material) may comprise (e.g. be formed from, consist of or consist essentially of) one or more of: a metal oxide such as an alkaline earth metal oxide, for example, beryllium oxide (BeO), a transition metal oxide, for example, zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate or phyllosilicate mineral such as mullite; or a glass ceramic such as a machinable glass ceramic. These materials may have a dielectric strength no less than about 7800 kV/m and no greater than about 39000 kV/m.

The electrically-insulating filler (e.g. the first electrically-insulating granular material) may comprise (e.g. be formed from, consist of or consist essentially of) one or more of: a transition metal oxide, for example, zirconium dioxide ($ZrO_2$), or hafnium dioxide ($HfO_2$); a nitride such as a Group 13 nitride, for example, boron nitride (BN) or aluminium nitride (AlN), or a Group 14 nitride, for example, silicon nitride (SiN); or a glass ceramic such as a machinable glass ceramic. These materials may have a dielectric strength no less than about 15000 kV/m and no greater than about 39000 kV/m.

The electrically-insulating filler (e.g. the first electrically-insulating granular material) may comprise (e.g. be formed from, consist of or consist essentially of) one or more of: a transition metal oxide, for example, zirconium dioxide ($ZrO_2$), or hafnium dioxide ($HfO_2$); a nitride such as a Group 13 nitride, for example, boron nitride (BN), or a glass ceramic such as a machinable glass ceramic. These materials may have a dielectric strength no less than about 23000 kV/m and no greater than about 39000 kV/m.

The electrically-insulating filler (e.g. the first electrically-insulating granular material) may comprise (e.g. be formed from, consist of or consist essentially of) one or more materials having a melting point no less than about 1000° C., for example, no less than about 2000° C., or no less than about 3000° C. For example, electrically-insulating filler (e.g. the first electrically-insulating granular material) may have a melting point no less than about 1000° C., for example, no less than about 2000° C., or no less than about 3000° C.

The electrically-insulating filler (e.g. the first electrically-insulating granular material) may comprise (e.g. be formed from, consist of or consist essentially of) one or more of: a metal oxide such as an alkaline earth metal oxide, for example, magnesium oxide (MgO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); or a silicate, aluminium silicate, aluminosilicate or phyllosilicate mineral such as mullite. These materials may have a melting point no less than about 1000° C.

The electrically-insulating filler (e.g. the first electrically-insulating granular material) may comprise (e.g. be formed from, consist of or consist essentially of) one or more of: a metal oxide such as an alkaline earth metal oxide, for example, magnesium oxide (MgO), a transition metal oxide, for example, zirconium dioxide ($ZrO_2$), or hafnium dioxide ($HfO_2$), or a post transition metal oxide, for example, aluminium oxide ($Al_2O_3$); or a nitride such as a Group 13 nitride, for example, boron nitride (BN) or aluminium nitride (AlN). These materials may have a melting point no less than about 2000° C.

The electrically-insulating filler (e.g. the first electrically-insulating granular material) may comprise (e.g. be formed from, consist of or consist essentially of) one or more of: a nitride such as a Group 13 nitride, for example, boron nitride (BN) This material may have a melting point no less than about 3000° C.

The electrically-insulating filler (e.g. the first electrically-insulating granular material) may comprise (e.g. be formed from, consist of or consist essentially of) one or more materials having a thermal conductivity no less than about 3 W/mK, for example, no less than about 10 W/mK, or no less than about 100 W/mK, For example, the electrically-insulating filler (e.g. the first electrically-insulating granular material) may have a thermal conductivity no less than about 3 W/mK, for example no less than about 10 W/mK, or no less than about 100 W/mK.

The electrically-insulating filler (e.g. the first electrically-insulating granular material) may comprise (e.g. be formed from, consist of or consist essentially of) one or more of: a metal oxide such as an alkaline earth metal oxide, for example, beryllium oxide (BeO) or magnesium oxide (MgO), a transition metal oxide, for example, titanium dioxide ($TiO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite. These materials may have a thermal conductivity no less than about 3 W/mK.

The electrically-insulating filler (e.g. the first electrically-insulating granular material) may comprise (e.g. be formed from, consist of or consist essentially of) one or more of: a metal oxide such as an alkaline earth metal oxide, for example, beryllium oxide (BeO), a transition metal oxide, for example, titanium dioxide ($TiO_2$), or hafnium dioxide ($HfO_2$), or a post transition metal oxide, for example, aluminium oxide ($Al_2O_3$); or a nitride such as a Group 13 nitride, for example, boron nitride (BN) or aluminium nitride (AlN), or a Group 14 nitride, for example, silicon nitride (SiN). These materials may have a thermal conductivity no less than about 10 W/mK.

The electrically-insulating filler (e.g. the first electrically-insulating granular material) may comprise (e.g. be formed from, consist of or consist essentially of) one or more of: a metal oxide such as an alkaline earth metal oxide, for example, beryllium oxide (BeO) or a nitride such as a Group 13 nitride, for example, aluminium nitride (AlN). These materials may have a thermal conductivity no less than about 100 W/mK.

The electrically-insulating filler (e.g. the first electrically-insulating granular material) may comprise (e.g. be formed from, consist of or consist essentially of) one or more materials having an electrical resistivity no less than about 100000 MΩm, for example, no less than about 1000000 MΩm, or no less than about 2000000 MΩm. For example, the electrically-insulating filler (e.g. the first electrically-insulating granular material) may have an electrical resistivity no less than about 100000 MΩm, for example, no less than about 1000000 MΩm, or no less than about 2000000 MΩm.

The electrically-insulating filler (e.g. the first electrically-insulating granular material) may comprise (e.g. be formed from, consist of or consist essentially of) one or more of: a metal oxide such as an alkaline earth metal oxide, for example, beryllium oxide (BeO) or magnesium oxide (MgO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN); a silicate, aluminium silicate, aluminosilicate or phyllosilicate mineral such as mullite; a glass ceramic such as a machinable glass ceramic. These materials may have an electrical resistivity no less than about 100000 MΩm.

The electrically-insulating filler (e.g. the first electrically-insulating granular material) may comprise (e.g. be formed from, consist of or consist essentially of) one or more of: a metal oxide such as an alkaline earth metal oxide, for example, beryllium oxide (BeO) or magnesium oxide (MgO), a transition metal oxide, for example, zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN); a silicate, aluminium silicate, aluminosilicate or phyllosilicate mineral such as mullite; a glass ceramic such as a machinable glass ceramic. These materials may have an electrical resistivity no less than about 1000000 MΩm.

The electrically-insulating filler (e.g. the first electrically-insulating granular material) may comprise one or more of: a metal oxide such as an alkaline earth metal oxide, for example, magnesium oxide (MgO), a transition metal oxide, for example, hafnium dioxide ($HfO_2$); or a nitride such as a Group 13 nitride, for example, boron nitride (BN). These materials may have an electrical resistivity no less than about 2000000 MΩm.

In embodiments in which the electrically-insulating filler comprises first and second electrically-insulating granular materials, the second electrically-insulating granular material may comprise one or more of: a metal oxide such as an alkaline earth metal oxide, for example, magnesium oxide (MgO), or a post transition metal oxide, for example, aluminium oxide ($Al_2O_3$); a nitride such as a Group 13 nitride, for example, aluminium nitride (AlN), or a Group 14 nitride, for example, silicon nitride (SiN); or a silicate, aluminium silicate, aluminosilicate or phyllosilicate mineral such as mullite. The second electrically-insulating granular material may be magnesium oxide (MgO). The second electrically-insulating granular material may comprise from about 80 wt. % to about 100 wt. %, for example, from about 85 wt. % to about 95 wt. %, or about 92 wt. %, magnesium oxide (MgO). Alternatively, the second electrically-insulating granular material may comprise one or more of: a metal oxide such as an alkaline earth metal oxide other than magnesium oxide (MgO), or a post transition metal oxide, for example, aluminium oxide ($Al_2O_3$); a nitride such as a Group 13 nitride, for example, aluminium nitride (AlN), or a Group 14 nitride, for example, silicon nitride (SiN); or a silicate, aluminium silicate, aluminosilicate or phyllosilicate mineral such as mullite. For example, it may be that the first electrically-insulating granular material comprises (e.g. is or consists essentially of) magnesium oxide (MgO) and the second electrically-insulating granular material comprises (e.g. consists of or consists essentially of) one or more of: a metal oxide such as an alkaline earth metal oxide other than magnesium oxide (MgO), or a post transition metal oxide, for example, aluminium oxide ($Al_2O_3$); a nitride such as a Group 13 nitride, for example, aluminium nitride (AlN), or a Group 14 nitride, for example, silicon nitride (SiN); or a silicate, aluminium silicate, aluminosilicate or phyllosilicate mineral such as mullite.

The electrically insulating filler may comprise no more than about 92 wt. % magnesium oxide. The electrically insulating filler comprise no more than about 90 wt. % magnesium oxide. The electrically insulating filler may comprise no more than about 80 wt. % magnesium oxide. The electrically insulating filler may comprise no more than about 70 wt. % magnesium oxide. The electrically insulating filler may comprise no more than about 60 wt. % magnesium oxide. The electrically insulating filler may comprise no more than about 50 wt. % magnesium oxide. The electrically insulating filler may comprise no more than about 40 wt. % magnesium oxide. The electrically insulating filler may comprise no more than about 30 wt. % magnesium oxide. The electrically insulating filler may comprise no more than about 20 wt. % magnesium oxide. The electrically insulating filler may comprise no more than about 10 wt. % magnesium oxide. The electrically insulating filler may comprise no more than about 5 wt. % magnesium oxide.

The electrically insulating filler may comprise no more than about 10 wt. % of the first electrically-insulating granular material and no less than about 90 wt. % of the second electrically insulating granular material. The electrically insulating filler may comprise no more than about 20 wt. % of the first electrically-insulating granular material and no less than about 80 wt. % of the second electrically insulating granular material. The electrically insulating filler may comprise no more than about 30 wt. % of the first electrically-insulating granular material and no less than about 70 wt. % of the second electrically insulating granular material. The electrically insulating filler may comprise no more than about 40 wt. % of the first electrically-insulating granular material and no less than about 60 wt. % of the second electrically insulating granular material. The electrically insulating filler may comprise no more than about 50 wt. % of the first electrically-insulating granular material and no less than about 50 wt. % of the second electrically insulating granular material. The electrically insulating filler may comprise no more than about 60 wt. % of the first electrically-insulating granular material and no less than about 40 wt. % of the second electrically insulating granular material. The electrically insulating filler may comprise no more than about 70 wt. % of the first electrically-insulating granular material and no less than about 30 wt. % of the second electrically insulating granular material. The electrically insulating filler may comprise no more than about 80 wt. % of the first electrically-insulating granular material and no less than about 20 wt. % of the second electrically insulating granular material. The electrically insulating filler may comprise no more than about 90 wt. % of the first electrically-insulating granular material and no less than about 10 wt. % of the second electrically insulating granular material.

Relative Dielectric Strengths of Electrically Insulating Barrier and Electrically Insulating Filler The electrically insulating barrier and the electrically insulating filler may comprise different materials. For example, the electrically insulating barrier and the electrically insulating filler may consist of different materials (i.e. they may have no materials in common).

Alternatively, the electrically insulating barrier and the electrically insulating filler may comprise one or more materials in common, said one or more materials being present in different amounts (e.g. concentrations) such that that the electrically insulating barrier has a higher dielectric strength than the electrically insulating filler. For example, the electrically insulating barrier may comprise a greater percentage by weight of a particular high-dielectric-strength material than the percentage by weight of the same high-dielectric-strength material in the electrically insulating filler.

The electrically insulating filler may have a dielectric strength of no greater than about 1500 kV/m, and the electrically insulating barrier may have a dielectric strength of greater than about 1500 kV/m, for example, no less than about 6000 kV/m, or no less than about 7000 kV/m, or no less than about 7800 kV/m, or no less than about 10000 kV/m, or no less than about 15000 kV/m, or no less than about 20000 kV/m, or no less than about 23000 kV/m.

The electrically insulating filler may have a dielectric strength of no greater than about 1500 kV/m, and the electrically insulating barrier may have a dielectric strength no greater than about 1000000 kV/m, for example, no greater than about 500000 kV/m, or no greater than about 250000 kV/m, or no greater than about 100000 kV/m, or no greater than about 50000 kV/m, or no greater than about 40000 kV/m, or no greater than about 39000 kV/m, or no greater than about 30000 kV/m, or no greater than about 20000 kV/m, or no greater than about 10000 kV/m.

The electrically insulating filler may have a dielectric strength of no greater than about 1500 kV/m, and the electrically insulating barrier may have a dielectric strength greater than about 1500 kV/m (e.g. no less than about 1501 kV/m) and no greater than about 1000000 kV/m, for example, greater than about 1500 kV/m (e.g. no less than about 1501 kV/m) and no greater than about 500000 kV/m, or greater than about 1500 kV/m (e.g. no less than about 1501 kV/m) and no greater than about 250000 kV/m, or greater than about 1500 kV/m (e.g. no less than about 1501 kV/m) and no greater than about 100000 kV/m, or greater than about 1500 kV/m (e.g. no less than about 1501 kV/m) and no greater than about 50000 kV/m, or greater than about 1500 kV/m (e.g. no less than about 1501 kV/m) and no greater than about 40000 kV/m, or greater than about 1500 kV/m (e.g. no less than about 1501 kV/m) and no greater than about 39000 kV/m, for example, no less than about 7800 kV/m and no greater than about 39000 kV/m, for example, no less than about 15000 kV/m and no greater than about 39000 kV/m, for example, no less than about 23000 kV/m and no greater than about 39000 kV/m.

The electrically insulating filler may have a dielectric strength of no greater than about 1500 kV/m, and the electrically insulating barrier may have a dielectric strength no less than about 6000 kV/m and no greater than about 1000000 kV/m, for example, no less than about 6000 kV/m and no greater than about 500000 kV/m, or no less than about 6000 kV/m and no greater than about 250000 kV/m, or no less than about 6000 kV/m and no greater than about 100000 kV/m, or no less than about 6000 kV/m and no greater than about 50000 kV/m, or no less than about 6000 kV/m and no greater than about 40000 kV/m, for example, no less than about 7800 kV/m and no greater than about 40000 kV/m, for example, no less than about 15000 kV/m and no greater than about 40000 kV/m, for example, no less than about 23000 kV/m and no greater than about 40000 kV/m.

The electrically insulating filler may have a dielectric strength of no greater than about 1500 kV/m, and the electrically insulating barrier may have a dielectric strength no less than about 7800 kV/m and no greater than about 1000000 kV/m, for example, no less than about 7800 kV/m and no greater than about 500000 kV/m, or no less than about 7800 kV/m and no greater than about 250000 kV/m, or no less than about 7800 kV/m and no greater than about 100000 kV/m, or no less than about 7800 kV/m and no greater than about 50000 kV/m, for example, no less than about 15000 kV/m and no greater than about 50000 kV/m, for example, no less than about 23000 kV/m and no greater than about 50000 kV/m.

The electrically insulating filler may have a dielectric strength of no greater than about 1500 kV/m, and the electrically insulating barrier may have a dielectric strength no less than about 15000 kV/m and no greater than about 1000000 kV/m, for example, no less than about 15000 kV/m and no greater than about 500000 kV/m, or no less than about 15000 kV/m and no greater than about 250000 kV/m, or no less than about 15000 kV/m and no greater than about 100000 kV/m, for example, no less than about 23000 kV/m and no greater than about 100000 kV/m.

The electrically insulating filler may have a dielectric strength of no greater than about 6000 kV/m, and the electrically insulating barrier may have a dielectric strength of no less than about 7000 kV/m, or no less than about 7800 kV/m, or no less than about 10000 kV/m, or no less than about 15000 kV/m, or no less than about 20000 kV/m, or no less than about 23000 kV/m.

The electrically insulating filler may have a dielectric strength of no greater than about 6000 kV/m, and the electrically insulating barrier may have a dielectric strength no greater than about 1000000 kV/m, for example, no greater than about 500000 kV/m, or no greater than about 250000 kV/m, or no greater than about 100000 kV/m, or no greater than about 50000 kV/m, or no greater than about 40000 kV/m, or no greater than about 39000 kV/m, or no greater than about 30000 kV/m, or no greater than about 20000 kV/m, or no greater than about 10000 kV/m.

The electrically insulating filler may have a dielectric strength of no greater than about 6000 kV/m, and the electrically insulating barrier may have a dielectric strength greater than about 6000 kV/m (e.g. no less than about 6001 kV/m) and no greater than about 1000000 kV/m, for example, greater than about 6000 kV/m (e.g. no less than about 6001 kV/m) and no greater than about 500000 kV/m, or greater than about 6000 kV/m (e.g. no less than about 6001 kV/m) and no greater than about 250000 kV/m, or greater than about 6000 kV/m (e.g. no less than about 6001 kV/m) and no greater than about 100000 kV/m, or greater than about 6000 kV/m (e.g. no less than about 6001 kV/m) and no greater than about 50000 kV/m, or greater than about 6000 kV/m (e.g. no less than about 6001 kV/m) and no greater than about 40000 kV/m, or greater than about 6000 kV/m (e.g. no less than about 6001 kV/m) and no greater than about 39000 kV/m, for example, no less than about 7800 kV/m and no greater than about 39000 kV/m, for example, no less than about 15000 kV/m and no greater than about 39000 kV/m, for example, no less than about 23000 kV/m and no greater than about 39000 kV/m.

The electrically insulating filler may have a dielectric strength of no greater than about 6000 kV/m, and the electrically insulating barrier may have a dielectric strength greater than about 6000 kV/m and no greater than about 1000000 kV/m, for example, greater than about 6000 kV/m and no greater than about 500000 kV/m, or greater than about 6000 kV/m and no greater than about 250000 kV/m, or greater than about 6000 kV/m and no greater than about 100000 kV/m, or greater than about 6000 kV/m and no greater than about 50000 kV/m, or greater than about 6000 kV/m and no greater than about 40000 kV/m, for example, no less than about 7800 kV/m and no greater than about 40000 kV/m, for example, no less than about 15000 kV/m and no greater than about 40000 kV/m, for example, no less than about 23000 kV/m and no greater than about 40000 kV/m.

The electrically insulating filler may have a dielectric strength of no greater than about 6000 kV/m, and the electrically insulating barrier may have a dielectric strength no less than about 7800 kV/m and no greater than about 1000000 kV/m, for example, no less than about 7800 kV/m and no greater than about 500000 kV/m, or no less than about 7800 kV/m and no greater than about 250000 kV/m, or no less than about 7800 kV/m and no greater than about 100000 kV/m, or no less than about 7800 kV/m and no greater than about 50000 kV/m, for example, no less than about 15000 kV/m and no greater than about 50000 kV/m, for example, no less than about 23000 kV/m and no greater than about 50000 kV/m.

The electrically insulating filler may have a dielectric strength of no greater than about 6000 kV/m, and the electrically insulating barrier may have a dielectric strength no less than about 15000 kV/m and no greater than about 1000000 kV/m, for example, no less than about 15000 kV/m and no greater than about 500000 kV/m, or no less than about 15000 kV/m and no greater than about 250000 kV/m, or no less than about 15000 kV/m and no greater than about 100000 kV/m, for example, no less than about 23000 kV/m and no greater than about 100000 kV/m.

The electrically insulating filler may have a dielectric strength of no greater than about 7000 kV/m, and the electrically insulating barrier may have a dielectric strength of no less than about 7800 kV/m, or no less than about 10000 kV/m, or no less than about 15000 kV/m, or no less than about 20000 kV/m, or no less than about 23000 kV/m.

The electrically insulating filler may have a dielectric strength of no greater than about 7000 kV/m, and the electrically insulating barrier may have a dielectric strength no greater than about 1000000 kV/m, for example, no greater than about 500000 kV/m, or no greater than about 250000 kV/m, or no greater than about 100000 kV/m, or no greater than about 50000 kV/m, or no greater than about 40000 kV/m, or no greater than about 39000 kV/m, or no greater than about 30000 kV/m, or no greater than about 20000 kV/m, or no greater than about 10000 kV/m.

The electrically insulating filler may have a dielectric strength of no greater than about 7000 kV/m, and the electrically insulating barrier may have a dielectric strength greater than about 7000 kV/m (e.g. no less than about 7001 kV/m) and no greater than about 1000000 kV/m, for example, greater than about 7000 kV/m (e.g. no less than about 7001 kV/m) and no greater than about 500000 kV/m, or greater than about 7000 kV/m (e.g. no less than about 7001 kV/m) and no greater than about 250000 kV/m, or greater than about 7000 kV/m (e.g. no less than about 7001 kV/m) and no greater than about 100000 kV/m, or greater than about 7000 kV/m (e.g. no less than about 7001 kV/m) and no greater than about 50000 kV/m, or greater than about 7000 kV/m (e.g. no less than about 7001 kV/m) and no greater than about 40000 kV/m, or greater than about 7000 kV/m (e.g. no less than about 7001 kV/m) and no greater than about 39000 kV/m, for example, no less than about 7800 kV/m and no greater than about 39000 kV/m, for example, no less than about 15000 kV/m and no greater than about 39000 kV/m, for example, no less than about 23000 kV/m and no greater than about 39000 kV/m.

The electrically insulating filler may have a dielectric strength of no greater than about 7000 kV/m, and the electrically insulating barrier may have a dielectric strength greater than about 7000 kV/m and no greater than about 1000000 kV/m, for example, greater than about 7000 kV/m and no greater than about 500000 kV/m, or greater than about 7000 kV/m and no greater than about 250000 kV/m, or greater than about 7000 kV/m and no greater than about 100000 kV/m, or greater than about 7000 kV/m and no greater than about 50000 kV/m, or greater than about 7000 kV/m and no greater than about 40000 kV/m, for example, no less than about 7800 kV/m and no greater than about 40000 kV/m, for example, no less than about 15000 kV/m and no greater than about 40000 kV/m, for example, no less than about 23000 kV/m and no greater than about 40000 kV/m.

The electrically insulating filler may have a dielectric strength of no greater than about 7000 kV/m, and the electrically insulating barrier may have a dielectric strength no less than about 7800 kV/m and no greater than about 1000000 kV/m, for example, no less than about 7800 kV/m and no greater than about 500000 kV/m, or no less than about 7800 kV/m and no greater than about 250000 kV/m, or no less than about 7800 kV/m and no greater than about 100000 kV/m, or no less than about 7800 kV/m and no greater than about 50000 kV/m, for example, no less than about 15000 kV/m and no greater than about 50000 kV/m, for example, no less than about 23000 kV/m and no greater than about 50000 kV/m.

The electrically insulating filler may have a dielectric strength of no greater than about 7000 kV/m, and the electrically insulating barrier may have a dielectric strength no less than about 15000 kV/m and no greater than about 1000000 kV/m, for example, no less than about 15000 kV/m and no greater than about 500000 kV/m, or no less than about 15000 kV/m and no greater than about 250000 kV/m, or no less than about 15000 kV/m and no greater than about 100000 kV/m, for example, no less than about 23000 kV/m and no greater than about 100000 kV/m.

The electrically insulating filler may have a dielectric strength of no greater than about 7800 kV/m, and the electrically insulating barrier may have a dielectric strength of no less than about 10000 kV/m, or no less than about 15000 kV/m, or no less than about 20000 kV/m, or no less than about 23000 kV/m.

The electrically insulating filler may have a dielectric strength of no greater than about 7800 kV/m, and the electrically insulating barrier may have a dielectric strength no greater than about 1000000 kV/m, for example, no greater than about 500000 kV/m, or no greater than about 250000 kV/m, or no greater than about 100000 kV/m, or no greater than about 50000 kV/m, or no greater than about 40000 kV/m, or no greater than about 39000 kV/m, or no greater than about 30000 kV/m, or no greater than about 20000 kV/m, or no greater than about 10000 kV/m.

The electrically insulating filler may have a dielectric strength of no greater than about 7800 kV/m, and the electrically insulating barrier may have a dielectric strength greater than about 7800 kV/m (e.g. no less than about 7801 kV/m) and no greater than about 1000000 kV/m, for example, greater than about 7800 kV/m (e.g. no less than about 7801 kV/m) and no greater than about 500000 kV/m, or greater than about 7800 kV/m (e.g. no less than about 7801 kV/m) and no greater than about 250000 kV/m, or greater than about 7800 kV/m (e.g. no less than about 7801 kV/m) and no greater than about 100000 kV/m, or greater than about 7800 kV/m (e.g. no less than about 7801 kV/m) and no greater than about 50000 kV/m, or greater than about 7800 kV/m (e.g. no less than about 7801 kV/m) and no greater than about 40000 kV/m, or greater than about 7800 kV/m (e.g. no less than about 7801 kV/m) and no greater than about 39000 kV/m, for example, no less than about 15000 kV/m and no greater than about 39000 kV/m, for example, no less than about 23000 kV/m and no greater than about 39000 kV/m.

The electrically insulating filler may have a dielectric strength of no greater than about 7800 kV/m, and the electrically insulating barrier may have a dielectric strength greater than about 7800 kV/m and no greater than about 1000000 kV/m, for example, greater than about 7800 kV/m and no greater than about 500000 kV/m, or greater than about 7800 kV/m and no greater than about 250000 kV/m, or greater than about 7800 kV/m and no greater than about 100000 kV/m, or greater than about 7800 kV/m and no greater than about 50000 kV/m, or greater than about 7800 kV/m and no greater than about 40000 kV/m, for example, no less than about 15000 kV/m and no greater than about 40000 kV/m, for example, no less than about 23000 kV/m and no greater than about 40000 kV/m.

The electrically insulating filler may have a dielectric strength of no greater than about 7800 kV/m, and the electrically insulating barrier may have a dielectric strength no less than about 15000 kV/m and no greater than about 50000 kV/m, for example, no less than about 23000 kV/m and no greater than about 50000 kV/m.

The electrically insulating filler may have a dielectric strength of no greater than about 7800 kV/m, and the electrically insulating barrier may have a dielectric strength no less than about 15000 kV/m and no greater than about 1000000 kV/m, for example, no less than about 15000 kV/m and no greater than about 500000 kV/m, or no less than about 15000 kV/m and no greater than about 250000 kV/m, or no less than about 15000 kV/m and no greater than about 100000 kV/m, for example, no less than about 23000 kV/m and no greater than about 100000 kV/m.

The electrically insulating filler may have a dielectric strength of no greater than about 10000 kV/m, and the electrically insulating barrier may have a dielectric strength of no less than about 15000 kV/m, or no less than about 20000 kV/m, or no less than about 23000 kV/m.

The electrically insulating filler may have a dielectric strength of no greater than about 10000 kV/m, and the electrically insulating barrier may have a dielectric strength no greater than about 1000000 kV/m, for example, no greater than about 500000 kV/m, or no greater than about 250000 kV/m, or no greater than about 100000 kV/m, or no greater than about 50000 kV/m, or no greater than about 40000 kV/m, or no greater than about 39000 kV/m, or no greater than about 30000 kV/m, or no greater than about 20000 kV/m, or no greater than about 10000 kV/m.

The electrically insulating filler may have a dielectric strength of no greater than about 10000 kV/m, and the electrically insulating barrier may have a dielectric strength greater than about 10000 kV/m (e.g. no less than about 10001 kV/m) and no greater than about 1000000 kV/m, for example, greater than about 10000 kV/m (e.g. no less than about 10001 kV/m) and no greater than about 500000 kV/m, or greater than about 10000 kV/m (e.g. no less than about 10001 kV/m) and no greater than about 250000 kV/m, or greater than about 10000 kV/m (e.g. no less than about 10001 kV/m) and no greater than about 100000 kV/m, or greater than about 10000 kV/m (e.g. no less than about 10001 kV/m) and no greater than about 50000 kV/m, or greater than about 10000 kV/m (e.g. no less than about 10001 kV/m) and no greater than about 40000 kV/m, or greater than about 10000 kV/m (e.g. no less than about 10001 kV/m) and no greater than about 39000 kV/m, for example, no less than about 15000 kV/m and no greater than about 39000 kV/m, for example, no less than about 23000 kV/m and no greater than about 39000 kV/m.

The electrically insulating filler may have a dielectric strength of no greater than about 10000 kV/m, and the electrically insulating barrier may have a dielectric strength greater than about 10000 kV/m and no greater than about 1000000 kV/m, for example, greater than about 10000 kV/m and no greater than about 500000 kV/m, or greater than about 10000 kV/m and no greater than about 250000 kV/m, or greater than about 10000 kV/m and no greater than about 100000 kV/m, or greater than about 10000 kV/m and no greater than about 50000 kV/m, or greater than about 10000 kV/m and no greater than about 40000 kV/m, for example, no less than about 15000 kV/m and no greater than about 40000 kV/m, for example, no less than about 23000 kV/m and no greater than about 40000 kV/m.

The electrically insulating filler may have a dielectric strength of no greater than about 10000 kV/m, and the electrically insulating barrier may have a dielectric strength no less than about 15000 kV/m and no greater than about 50000 kV/m, for example, no less than about 23000 kV/m and no greater than about 50000 kV/m.

The electrically insulating filler may have a dielectric strength of no greater than about 10000 kV/m, and the electrically insulating barrier may have a dielectric strength no less than about 15000 kV/m and no greater than about 1000000 kV/m, for example, no less than about 15000 kV/m and no greater than about 500000 kV/m, or no less than about 15000 kV/m and no greater than about 250000 kV/m, or no less than about 15000 kV/m and no greater than about 100000 kV/m, for example, no less than about 23000 kV/m and no greater than about 100000 kV/m.

The electrically insulating filler may comprise (e.g. consist of or consist essentially of) magnesium oxide (MgO) and the electrically insulating barrier may have a dielectric strength no less than about 15000 kV/m and no greater than about 1000000 kV/m, for example, no less than about 15000 kV/m and no greater than about 500000 kV/m, or no less than about 15000 kV/m and no greater than about 250000 kV/m, or no less than about 15000 kV/m and no greater than about 100000 kV/m, for example, no less than about 23000 kV/m and no greater than about 100000 kV/m.

The electrically insulating filler may comprise (e.g. consist of or consist essentially of) magnesium oxide (MgO) and the electrically insulating barrier may have a dielectric strength greater than the dielectric strength of magnesium oxide (MgO).

The electrically insulating filler may comprise no less than about 50 wt. %, for example, no less than about 75 wt. %, or no less than about 90 wt. %, magnesium oxide (MgO), and the electrically insulating barrier may have a dielectric strength greater than the dielectric strength of magnesium oxide (MgO).

The electrically insulating filler may comprise no less than about 50 wt. %, for example, no less than about 75 wt. %, or no less than about 90 wt. %, magnesium oxide (MgO), and the electrically insulating barrier may comprise no greater than about 10 wt. %, for example, no greater than about 5 wt. %, magnesium oxide (MgO).

The heating element unit may be for use in an electric resistance heater having a maximum operating temperature of (a) 450° C., (b) 300° C. or (c) 260° C.

The heating element unit may be for use in an electric resistance heater having a maximum operating temperature of 1200° C.

The maximum operating temperature of an electric resistance heater is the maximum temperature of the casing of the heating element unit achieved during operation at the rated voltage.

There is also provided herein a method of manufacturing the heating element unit, the method comprising: providing the heating element within the casing; providing the electrical supply pin in electrical contact with the heating element; providing the electrically insulating filler between the heating element and the casing; and providing the electrically insulating barrier within the casing between portions of the heating element, the electrical supply pin and/or the casing.

Further provided herein is an electric resistance heater comprising a heating element unit.

For the avoidance of doubt, the invention extends to the subject-matter set out in the following numbered paragraphs.

1. A heating element unit for an electric resistance heater, the heating element unit comprising: a casing; a heating element within the casing; an electrical supply pin in electrical contact with the heating element; an electrically insulating filler between the heating element and the casing; and an electrically insulating barrier provided between portions of the heating element, the electrical supply pin and/or the casing, the electrically insulating barrier having a greater dielectric strength than the electrically insulating filler, wherein the dielectric strength of the electrically insulating barrier is greater than about 1500 kV/m (greater than about 40 V/mil).
2. A heating element unit according to paragraph 1, wherein the electrically insulating barrier is provided between portions of the heating element and the casing.
3. A heating element unit according to paragraph 1 or paragraph 2, wherein the electrical supply pin is a first electrical supply pin provided at a first end of the heating element unit where the first electrical supply pin is in electrical contact with the heating element, the heating element unit comprises a second electrical supply pin provided at a second, opposing end of the heating element unit where the second electrical supply pin is in electrical contact with the heating element, the heating element extends between the first and second ends of the heating element unit, and the electrically insulating barrier is provided between portions of the heating element and the casing, between portions of the first electrical supply pin and the casing, and/or between portions of the second electrical supply pin and the casing.
4. A heating element unit according to paragraph 1 or paragraph 2, wherein the electrical supply pin is a first electrical supply pin provided at a first end of the heating element unit where the first electrical supply pin is in electrical contact with the heating element, the heating element unit comprises a second electrical supply pin also provided at said first end of the heating element unit where the second electrical supply pin is also in electrical contact with the heating element, the heating element comprises at least first and second sections spaced apart from one another, and the electrically insulating barrier is provided between portions of the at least first and second sections of the heating element, between portions of the first and second electrical supply pins, between portions of the first electrical supply pin and the casing, between portions of the second electrical supply pin and the casing, and/or between portions of the heating element and the casing.
5. A heating element unit according to any of paragraphs 1-4, wherein the heating element is a first heating element, the heating element unit further comprises a second heating element, and the electrically insulating barrier is provided between portions of the first and second heating elements.
6. A heating element unit according to paragraph 5, wherein the heating element unit comprises three or more heating elements including the first and second heating elements.
7. A heating element unit according to any preceding paragraph, wherein the electrically insulating barrier extends along at least a portion of a length of the heating element unit, substantially parallel to a longitudinal axis of the heating element unit.
8. A heating element unit according to paragraph 7, wherein the electrically insulating barrier has a substantially rectangular shape in cross-section in a plane perpendicular to the longitudinal axis.
9. A heating element unit according to paragraph 7, wherein the electrically insulating barrier comprises a plurality of electrically insulating barrier wall portions when viewed in cross-section in a plane perpendicular to the longitudinal axis.
10. A heating element unit according to paragraph 9, wherein the electrically insulating barrier wall portions are arranged radially around the longitudinal axis.
11. A heating element unit according to paragraph 10, wherein the plurality of electrically insulating barrier wall portions are arranged in a cross or star configuration.
12. A heating element unit according to paragraph 11, wherein the electrically insulating barrier has a X-shaped cross-section in the plane perpendicular to the longitudinal axis.
13. A heating element unit according to any of paragraphs 1-8, wherein the electrically insulating barrier is an electrically insulating sleeve, for example a preformed electrically insulating sleeve.

14. A heating element unit according to paragraph 13, wherein the electrically insulating sleeve surrounds at least a portion of the heating element and/or at least a portion of the electrical supply pin and is closer to the said at least a portion of the heating element and/or at least a portion of the electrical supply pin than to the casing.
15. A heating element unit according to paragraph 13, wherein the sleeve is closer to the casing than the heating element and/or the electrical supply pin.
16. A heating element unit according to any preceding paragraph, wherein the electrically insulating barrier extends between first and second longitudinal ends, and the electrically insulating barrier tapers in a radial direction towards the first end.
17. A heating element unit according to paragraph 16, wherein the electrically insulating barrier is insertable into the casing in an insertion direction, wherein the first end of the electrically insulating barrier is the first part of the electrically insulating barrier to be inserted into the casing in the insertion direction.
18. A heating element unit according to any preceding paragraph, wherein the electrically insulating barrier extends along substantially the entire length of the casing.
19. A heating element unit according to any of paragraphs 1-17, wherein the electrically insulating barrier extends only along a length of the electrical supply pin within the casing, along the length of the electrical supply pin within the casing and at least part of the length of the heating element, or along no greater than about 50%, for example, no greater than about 25%, or no greater than about 10%, of the length of the heating element unit.
20. A heating element unit according to any preceding paragraph, wherein the electrically insulating filler has a dielectric strength of no greater than about 1500 kV/m (40 V/mil).
21. A heating element unit according to any preceding paragraph, wherein the electrically insulating filler is a granular material.
22. A heating element unit according to any preceding paragraph, wherein the electrically insulating filler comprises one or more of: a metal oxide such as an alkaline earth metal, for example, magnesium oxide (MgO) or beryllium oxide (BeO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite or mica; a glass such as soda-lime glass, borosilicate glass or aluminosilicate glass; a ceramic; a glass ceramic such as a machinable glass ceramic; a polymer such a fluoropolymer, for example, polytetrafluoroethylene (PTFE), or a silicone.
23. A heating element unit according to any preceding paragraph, wherein the electrically insulating filler comprises granular magnesium oxide.
24. A heating element unit according to any preceding paragraph, wherein the electrically insulating barrier comprises one or more of: a metal oxide such as an alkaline earth metal oxide other than magnesium oxide (MgO), for example, beryllium oxide (BeO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite or mica; a glass such as soda-lime glass, borosilicate glass or aluminosilicate glass; a ceramic; a glass ceramic such as a machinable glass ceramic; a polymer such a fluoropolymer, for example, polytetrafluoroethylene (PTFE), or a silicone.
25. A heating element unit according to any preceding paragraph, wherein the electrically insulating barrier has a dielectric strength greater than about 1500 kV/m and no greater than about 39000 kV/m (greater than about 40 V/mil and no greater than about 1000 V/mil), for example, no less than about 7800 kV/m and no greater than about 39000 kV/m (no less than about 200 V/mil and no greater than about 1000 V/mil), or no less than about 15000 kV/m and no greater than about 39000 kV/m (no less than about 400 V/mil and no greater than about 1000 V/mil), or no less than about 23000 kV/m and no greater than about 39000 kV/m (no less than about 600 V/mil and no greater than about 1000 V/mil).
26. A heating element unit according to paragraph 25, wherein the electrically insulating barrier comprises one or more of: a metal oxide such as an alkaline earth metal oxide other than magnesium oxide (MgO), for example, beryllium oxide (BeO), a transition metal oxide, for example, zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite; or a glass ceramic such as a machinable glass ceramic.
27. A heating element unit according to paragraph 25, wherein the electrically insulating barrier comprises one or more of: a transition metal oxide, for example, zirconium dioxide ($ZrO_2$), or hafnium dioxide ($HfO_2$); a nitride such as a Group 13 nitride, for example, boron nitride (BN) or aluminium nitride (AlN), or a Group 14 nitride, for example, silicon nitride (SiN); or a glass ceramic such as a machinable glass ceramic.
28. A heating element unit according to paragraph 25, wherein the electrically insulating barrier comprises one or more of: a transition metal oxide, for example, zirconium dioxide ($ZrO_2$), or hafnium dioxide ($HfO_2$); a nitride such as a Group 13 nitride, for example, boron nitride (BN), or a glass ceramic such as a machinable glass ceramic.
29. A heating element unit according to any of paragraphs 1-25, wherein the electrically insulating barrier comprises one or more materials having a melting point no less than about 1000° C., for example, no less than about 2000° C., or no less than about 3000° C., for example wherein the electrically insulating barrier has a melting point no less than about 1000° C., or no less than about 2000° C., or no less than about 3000° C.
30. A heating element unit according to paragraph 29, wherein the electrically insulating barrier comprises one or more of: a metal oxide such as an alkaline earth metal oxide other than magnesium oxide (MgO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); or a silicate, aluminium silicate, aluminosilicate or phyllosilicate mineral such as mullite.

31. A heating element unit according to paragraph 29, wherein the electrically insulating barrier comprises one or more of: a metal oxide such as an alkaline earth metal oxide other than magnesium oxide (MgO), a transition metal oxide, for example, zirconium dioxide ($ZrO_2$), or hafnium dioxide ($HfO_2$), or a post transition metal oxide, for example, aluminium oxide ($Al_2O_3$); or a nitride such as a Group 13 nitride, for example, boron nitride (BN) or aluminium nitride (AlN).

32. A heating element unit according to paragraph 29, wherein the electrically insulating barrier comprises a nitride such as a Group 13 nitride, for example, boron nitride (BN).

33. A heating element unit according to any of paragraphs 1-25 or 29, wherein the electrically insulating barrier comprises one or more materials having a thermal conductivity no less than about 3 W/mK, for example, no less than about 10 W/mK, or no less than about 100 W/mK, for example, wherein the electrically insulating barrier has a thermal conductivity no less than about 3 W/mK, or no less than about 10 W/mK, or no less than about 100 W/mK.

34. A heating element unit according to paragraph 33, wherein the electrically insulating barrier comprises one or more of: a metal oxide such as an alkaline earth metal oxide other than magnesium oxide (MgO), for example, beryllium oxide (BeO), a transition metal oxide, for example, titanium dioxide ($TiO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite.

35. A heating element unit according to paragraph 33, wherein the electrically insulating barrier comprises one or more of: a metal oxide such as an alkaline earth metal oxide other than magnesium oxide (MgO), for example, beryllium oxide (BeO), a transition metal oxide, for example, titanium dioxide ($TiO_2$), or hafnium dioxide ($HfO_2$), or a post transition metal oxide, for example, aluminium oxide ($Al_2O_3$); or a nitride such as a Group 13 nitride, for example, boron nitride (BN) or aluminium nitride (AlN), or a Group 14 nitride, for example, silicon nitride (SiN).

36. A heating element unit according to paragraph 33, wherein the electrically insulating barrier comprises a metal oxide such as an alkaline earth metal oxide other than magnesium oxide (MgO), for example, beryllium oxide (BeO).

37. A heating element unit according to any of paragraphs 1-25, 29 or 33, wherein the electrically insulating barrier comprises one or more materials having an electrical resistivity no less than about 100000 MΩm, for example, no less than about 1000000 MΩm, or no less than about 2000000 MΩm, for example, wherein the electrically insulating barrier has an electrical resistivity of about 100000 MΩm, or no less than about 1000000 MΩm, or greater than about 2000000 MΩm.

38. A heating element unit according to paragraph 37, wherein the electrically insulating barrier comprises one or more of: a metal oxide such as an alkaline earth metal oxide other than magnesium oxide (MgO), for example, beryllium oxide (BeO), a transition metal oxide, for example, titanium dioxide ($TiO_2$), zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN); a silicate, aluminium silicate, aluminosilicate or phyllosilicate mineral such as mullite; a glass ceramic such as a machinable glass ceramic.

39. A heating element unit according to paragraph 37, wherein the electrically insulating barrier comprises one or more of: a metal oxide such as an alkaline earth metal oxide other than magnesium oxide (MgO), for example, beryllium oxide (BeO), a transition metal oxide, for example, zirconium dioxide ($ZrO_2$), or hafnium dioxide ($HfO_2$), or a post transition metal oxide, for example, aluminium oxide ($Al_2O_3$); a nitride such as a Group 13 nitride, for example, boron nitride (BN) or aluminium nitride (AlN); a silicate, aluminium silicate, aluminosilicate or phyllosilicate mineral such as mullite; a glass ceramic such as a machinable glass ceramic.

40. A heating element unit according to paragraph 37, wherein the electrically insulating barrier comprises one or more of: a metal oxide such as an alkaline earth metal oxide other than magnesium oxide (MgO), a transition metal oxide, for example, hafnium dioxide ($HfO_2$); or a nitride such as a Group 13 nitride, for example, boron nitride (BN).

41. A heating element unit according to any preceding paragraph, wherein the heating element unit is a tubular heater unit.

42. A heating element unit according to any of paragraphs 1-40, wherein the heating element unit is a cartridge heater unit.

43. A heating element unit according to any preceding paragraph, for use in an electric resistance heater having a maximum operating temperature of (a) 1200° C. (b) 450° C. or, (c) 300° C. or (d) 260° C.

44. A method of manufacturing a heating element unit according to any preceding paragraph, the method comprising: providing the heating element within the casing; providing the electrical supply pin in electrical contact with the heating element; providing the electrically insulating filler between the heating element and the casing; and providing the electrically insulating barrier within the casing between portions of the heating element, the electrical supply pin and/or the casing.

45. An electric resistance heater comprising a heating element unit according to any of paragraphs 1-43.

FIGURES

Embodiments will now be described by way of example only, with reference to the Figures, in which.

Figure 3C:
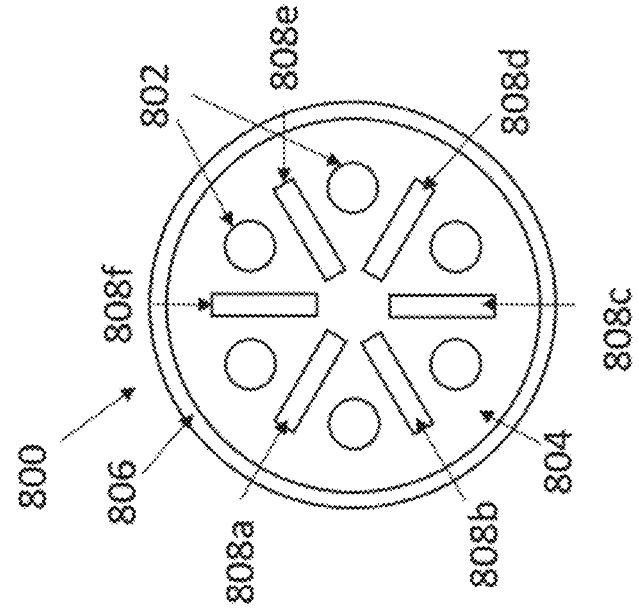
Figure 3B:
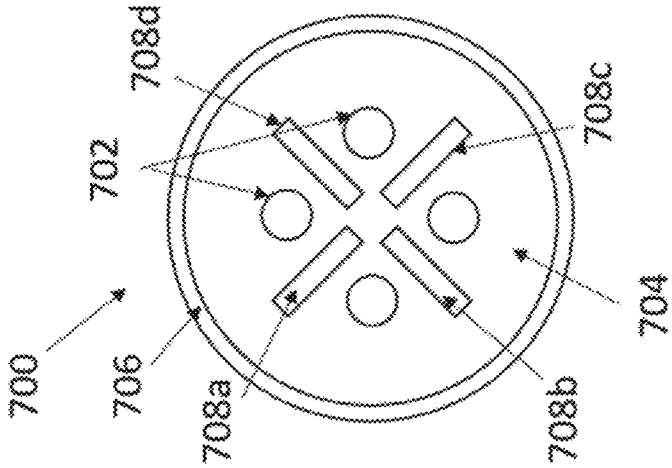
Figure 3A:
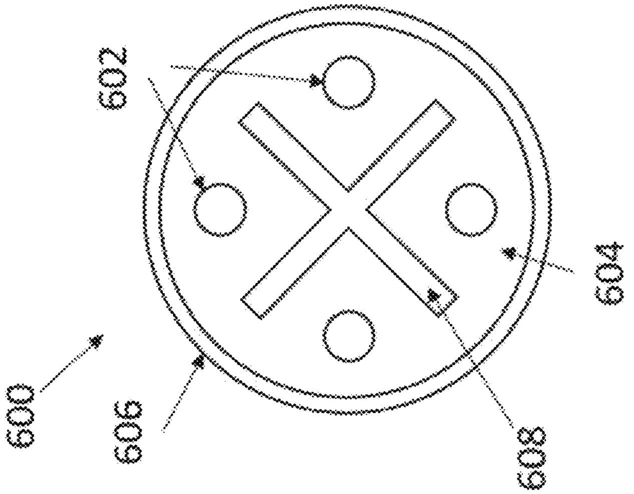
Figure 4:
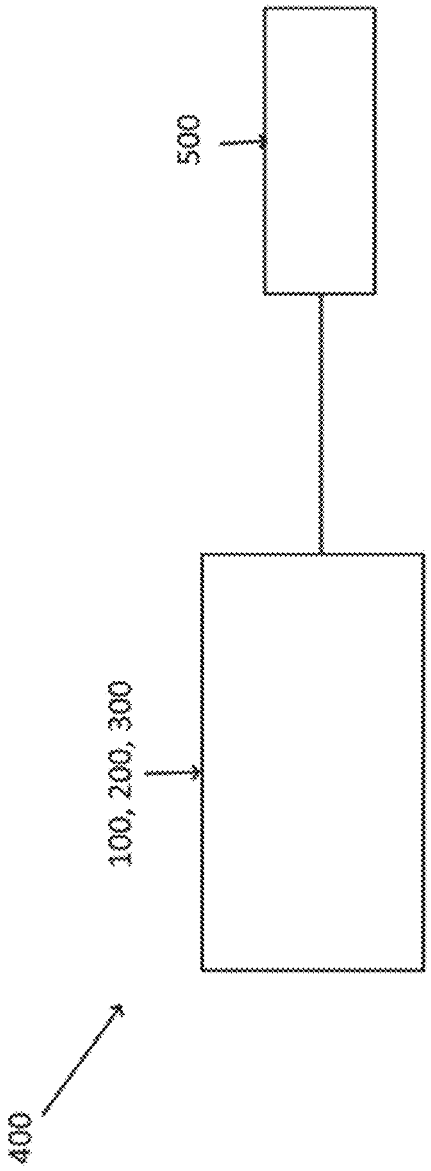

FIGS. 3*a*-3*c* are cross sectional views of third, fourth and fifth heating element units; and FIG. 4 is a schematic diagram of an electrical resistance heater.

DETAILED DESCRIPTION OF THE INVENTION

Figures 1A, 1B, 1C:
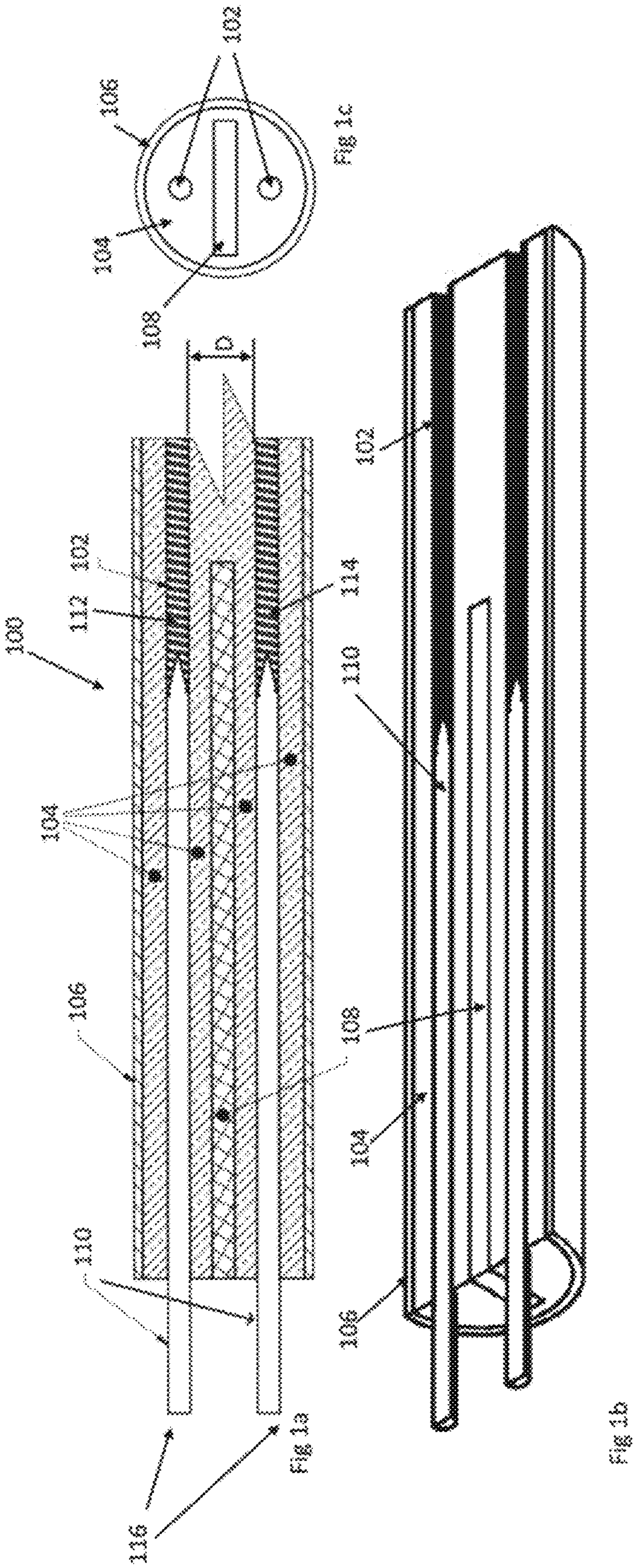
FIGS. 1a-1c are cross sectional views of a first example heating element unit.

FIGS. 1*a*-1*c* show a first example heating element unit 100 which comprises a heating element 102, an electrically insulating filler 104, an electrically insulating barrier 108, a casing 106, and two terminal pins 110. The casing 106 is substantially cylindrical and is in the form of a tubular sheath which surrounds the heating element 102, the electrically insulating filler 104 and the electrically insulating barrier 108.

The heating element 102 is in the form of a coil which extends within the casing 106. A first coil portion 112 extends in a substantially straight line along a longitudinal axis of the heating element unit, and curves around 180° (not shown) before passing back on itself within the casing, forming a second coil portion 114 which is substantially straight and substantially parallel to the first coil portion 112. The first and second coil portions 112, 114 are spaced apart by a distance D.

Each of the first and second coil portions 112, 114 of the heating element 102 are connected to a respective terminal, or electrical supply, pin 110. The terminal pins 110 are located mostly within the casing 106, and each comprises a respective end portion 116 which extends beyond the casing for connection to a power supply (not shown), so as to allow the application of a voltage to the end portions 116 of the terminal pins.

The electrically insulating barrier 108 is provided between adjacent portions of the pins 110 and of the first and second coil portions 112, 114. The electrically insulating barrier 108 has the form of a panel having a substantially rectangular cross section, when viewed along the longitudinal axis. In this example, the barrier 108 is located centrally between the terminal pins and centrally between the first and second coil portions 112, 114, is substantially cuboidal and extends longitudinally parallel to the first and second coil portions 112, 114. In this example, the barrier 108 extends along the entire length of the terminal pins within the casing 106, and also extends past the terminal pins 110 to extend between the first and second coil portions 112, 114. In other embodiments, the barrier 108 may extend a different length along the heating element unit 100.

The electrically insulating barrier 108 has a higher dielectric strength than the electrically insulating filler 104 (i.e. the electrically insulating barrier 108 is typically formed from higher dielectric strength materials than the electrically insulating filler 104). The electrically insulating barrier 108 therefore functions as a dielectric shield, effectively increasing the local dielectric strength of electrical insulation between components of the heating element unit 100 where the electrically insulating barrier 108 is provided. The presence of the electrically insulating barrier 108 therefore reduces the likelihood of local dielectric breakdown and thus increases the maximum volage at which the heating element unit 100 can be safely operated.

In the configuration shown in FIGS. 1*a-c*, in which the two terminal pins are located adjacent one another at the same end of the casing 106, it is desirable for the barrier 108 to extend at least between (e.g. the entire lengths of) the terminal pins 110 within the casing 106 as, in use of the heating element unit 100, the voltage is highest in this location and, thus, dielectric breakdown of any insulating material is most likely in this region.

In other examples, the barrier 108 may be formed of a plurality of barrier wall portions which are arranged within the casing, between portions of the heating element, the terminal pins and/or the casing. In some examples, the plurality of barrier wall portions may be discontinuous. In some examples, the plurality of barrier wall portions may for a X-shaped or a star-shaped cross section, when viewed along the longitudinal axis.

For example, cross sectional views of heating element units 600, 700, 800 having an alternative barrier arrangement are shown in FIGS. 3*a*-3*c*.

In FIG. 3*a*, the heating element unit 600 comprises a barrier 608 which is substantially X-shaped in cross-section, i.e. the barrier 608 has four barrier wall portions which meet in the centre of the heating element unit 600 and outwardly extend. Heating element portions 602 are disposed between each extending arm. Heating element portions 602 may be portions of the same, single heating element which extends back and forth along the length of the heating element unit 600. Alternatively, some of the heating element portions 602 may be portions of different heating elements, i.e. the heating element unit 600 may contain two or more heating elements which are not in electrical contact with one another. For example, the heating element unit 600 may contain four different heating elements which are electrically isolated from one another, in part, by the barrier 608. In another embodiment, the heating unit 600 contains two different heating elements which are electrically isolated from one another, each of the two heating elements extending in a substantially straight line parallel to the longitudinal axis of the heating element unit, curving around 180° and passing back on itself within the casing, thus forming two heating element portions which are spaced apart from one another at least partly by the barrier 608.

In FIG. 3*b*, the heating element unit 700 comprises four barrier wall portions 708*a*, 708*b*, 708*c*, 708*d* which are arranged to extend outwardly from the centre to form an X-shape, similarly to the arrangement of FIG. 3*a*. However, the barrier wall portions 708*a*, 708*b*, 708*c*, 708*d* of this heating element unit 700 do not meet at the centre of the unit 700 (i.e. there is insulating filler 704 disposed in the central region between each barrier wall portion 708*a*, 708*b*, 708*c*, 708*d*). Barrier wall portions 708*a*, 708*b*, 708*c*, 708*d* space apart heating element portions 702.

In FIG. 3*c*, the heating element unit 800 comprises six barrier wall portions 808*a*, 808*b*, 808*c*, 808*d*, 808*e*, 808*f* which are arranged to extend outwardly from the centre of the unit 800 in a star shape. The barrier wall portions 808*a*, 808*b*, 808*c*, 808*d*, 808*e*, 808*f* of this example do not meet in the centre, however in other arrangements, they may be arranged to be in contact with one, or integrally formed with, another.

It will be appreciated that barrier arrangements comprising any number of barrier wall portions are possible, the number and arrangement of the barrier wall portions being selected based on the number and arrangement of heating elements within the heating element unit. The barriers or barrier wall portions may also extend outwardly to the casing 106, 206, 606, 706, 806. For example, the barrier or barrier wall portions may extend the whole way from one side of the casing to the other side of the casing (e.g., across an entire diameter of the casing cross-section).

During manufacture of the heating element unit 100 (or equivalently, heating element units 600, 700 or 800), the barrier 108, or barrier wall portions may be inserted into the casing 106 before or after the filling of the casing 106 with the filler 104.

As mentioned above, the electrically insulating barrier 108 has a higher dielectric strength than the electrically insulating filler 104. In particular, the barrier 108 comprises a material having a dielectric strength greater than about 1500 kV/m (about 40 V/mil). In one example, the electrically insulating barrier 108 comprises powdered boron nitride, having an electrical resistivity of about $2.5\times10^6$ MΩm (about $9.85\times10^7$ MΩ·in) at ambient temperature, a dielectric strength of about 37500 kV/m (about 950 V/mil), and a thermal conductivity of about 30 W/mK. It will be appreciated that, in other embodiments, other materials having a dielectric strength greater than about 1500 kV/m (about 40V/mil) may be used as the barrier. For example, the barrier may comprise a metal oxide such as an alkaline earth metal oxide other than magnesium oxide (MgO), for example, beryllium oxide (BeO), a transition metal oxide, for example, titanium dioxide (TiO2), zirconium dioxide (ZrO2), or hafnium dioxide (HfO2), or a post transition metal oxide, for example, aluminium oxide (Al2O3); a nitride such as a Group 13 nitride, for example, boron nitride (BN) or aluminium nitride (AlN), or a Group 14 nitride, for example, silicon nitride (SiN); a silicate, aluminium silicate, aluminosilicate or phyllosilicate mineral such as mullite or mica; a glass such as soda-lime glass, borosilicate glass or aluminosilicate glass; a ceramic; a glass ceramic such as a machinable glass ceramic; a polymer such a fluoropolymer, for example, polytetrafluoroethylene (PTFE), or a silicone. The particular material used may be selected to target a desired dielectric strength, electrical resistivity, thermal conductivity, melting temperature or other physical or chemical property for a given heating element unit design.

The remainder of the space within the casing and around the heating element 102, electrical supply pins, 110 and the barrier 108 is filled with the electrically insulating filler 104, or base fill material. The electrically insulating filler 104 is thermally conducting. In this example, the filler 104 is a powder comprising about 92 wt. % magnesium oxide (the remainder of the powder being made up, for example, of other oxides such as silica, calcium oxide, alumina and iron oxide, and impurities). In this example, the filler 104 has an electrical resistivity of about $2\times10^6$ MΩm (about $8\times10^7$ MΩ·in) at ambient temperature, a dielectric strength of about 1500 kV/m (about 40 V/mil), and a thermal conductivity of about 5.2 W/mK. In other examples, the powder comprises alternative thermally conducting, electrically insulating materials such as beryllium oxide, titanium dioxide, zirconium dioxide, hafnium dioxide, aluminium oxide, boron nitride, aluminium nitride, silicon nitride, mullite or mica. In yet further examples, a prefilled ceramic, such as a prefilled MgO ceramic, may be used.

Thus, the barrier 108 comprises a material having a dielectric strength greater than the dielectric strength of the material from which the filler 104 is formed. By using a barrier 108 which comprises a material having a dielectric strength which is (a) greater than 1500 kV/m (about 40 V/mil) where the filler 104 comprises MgO, or more generally (b) greater than the dielectric strength of the material from which the filler 104 is formed, the effective dielectric strength in the heating element unit is increased compared to a heating element unit without such a barrier 108.

The heating element 102 is formed from a material having high electrical resistivity, for example, no less than about 0.90 $\Omega mm^2/m$ (540 Ω/cmf) and no greater than about 1.60 $\Omega mm^2/m$ (960 Ω/cmf). In the example, the heating element 102 is formed from a nichrome alloy, such as Nikrothal® 80 available from Kanthal AB, Sweden and has an electrical resistivity of about 1.09 $\Omega mm^2/m$ (654 Ω/cmf).

In use, a voltage is applied across the terminal pins 110, which causes the flow of current through the heating element 102. As current passes through the heating element, the heating element 102 heats up due to its high electrical resistance. The heat is passed to the casing (and the surroundings) via the barrier and the filler which have good thermally conducting properties. The barrier and the filler are electrically insulating and have high dielectric strengths (i.e., a high dielectric breakdown strength), which inhibits the flow of current from the heating element 102 to the casing 106. By using a barrier having an increased dielectric strength and a filler, higher voltages may be achieved without a concomitant increase in the amount of filler required or the size of the heating element, such that the process of transferring heat to the surroundings is rendered more efficient.

Figure 2C:
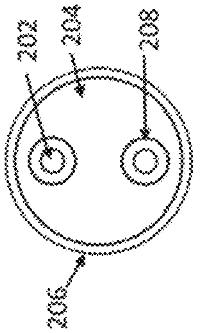
FIGS. 2a-2c are cross sectional views of a second example heating element unit.
Figure 2A:
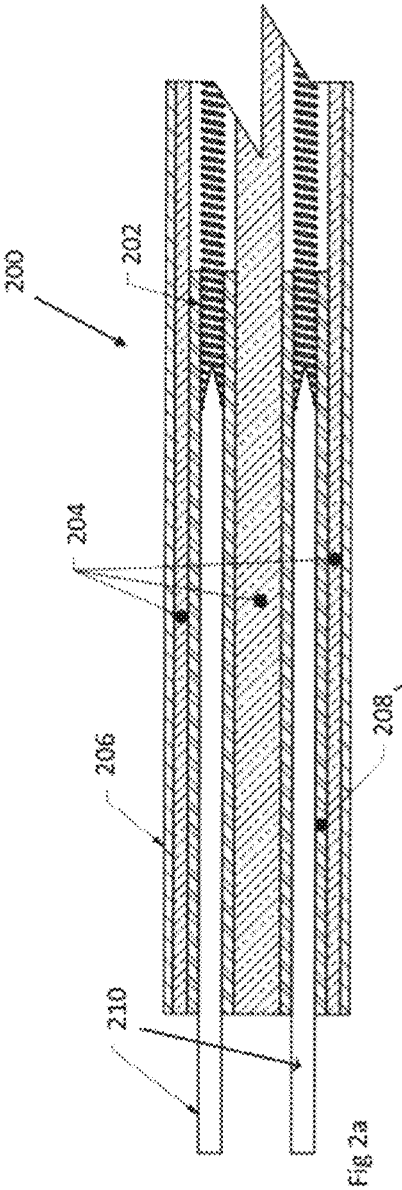
Figure 2B:
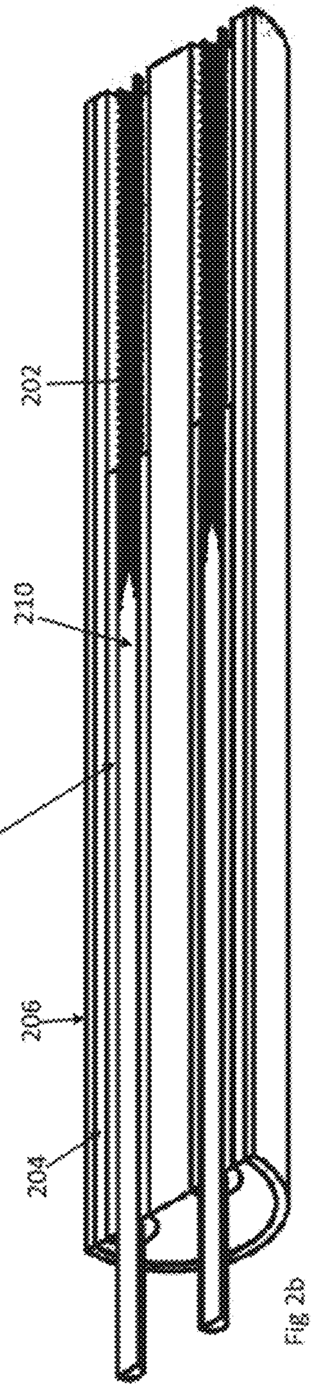

An alternative arrangement of the heating element unit is shown in FIGS. 2*a*-2*c*. In this arrangement, features corresponding to those previously described in relation to FIG. 1 are indicated with like reference numerals, increased by 100. For instance, the heating element 200 of FIG. 2*a*-2*c* comprises a casing 206 and a heating element 202.

The differences between the heating element unit 200 and the heating element unit 100 will now be described. In the heating element unit 200, the barrier is in the form of a sleeve 208 which is formed to fit around the heating element 202 and the terminal pins 210. The sleeve barrier 208 is a preformed sleeve. During manufacture of the heating element unit 200, the preformed sleeve 208 may be inserted into the casing 206 before or after the filling of the casing 206 with the filler 204.

The sleeve barrier 208 may be formed of, for example, a thermally conducting, electrically insulating polymer such as a silicone, hydrocarbon-based polymer or fluoropolymer (e.g., FEP/PTFE/PFA), a ceramic, glass, a glass ceramic, and/or a mineral such as mica, depending upon the desired application. In this example, the sleeve barrier is formed of FEP/PTFE.

In other embodiments, the sleeve barrier 208 is replaced by a coating barrier 208, which is formed on the heating element 202 by, for example, spraying or painting. In other arrangements, the sleeve barrier or coating barrier 208 may be formed to fit or to be applied on the inside of the casing 206. The coating barrier 208 may be ceramic-based (e.g. formed from ceramic-based materials such as Cerakote® coatings available from NIC Industries, Inc., USA, Duracote® coatings available from Duracote Corporation, USA, CeraGlide® coatings available from Saint Gobain Ceramics, France, or Aluma-Hyde® coatings available from Brownells, Inc., USA), and/or polymer-based (e.g. silicone based, hydrocarbon-based polymer based or fluoropolymer based) depending upon the desired application. In this example, the coating barrier 208 is formed of Cerakote. or CeraGlide®.

The barrier 108, barrier wall portions and/or sleeve barrier 208 may comprise a first end and a second end. During manufacture, the first end may be inserted into the casing 106, 206 first, i.e. before the second end. The barrier 108, barrier wall portions and/or sleeve barrier 208 may be tapered in a radial direction from the second end to the first end such that the barrier 108, barrier wall portions and/or sleeve barrier 208 can be easily inserted into the casing 106, 206. This is particularly advantageous if the barrier 108, barrier wall portions and/or sleeve barrier 208 are inserted into the casing 106, 206 after the casing 106, 206 has been filled with filler 104, 204.

It will be understood that the heating element unit may include a combination of the barriers of FIG. 1*a-c* or FIGS. 3*a-c* and the sleeve barrier or coating barrier of FIG. 2*a-c*.

In examples, in addition to use of an electrically insulating barrier, the dielectric strength of the filler 104 itself may be improved by using a combination of at least two different electrically insulating granular materials as the filler within the casing. For example, the filler may comprise a mix of powdered magnesium oxide and powdered boron nitride. In this example, the magnesium oxide powder has an electrical resistivity of about $2\times10^6$ MΩm (about $8\times10^7$ MΩ·in) at ambient temperature, a dielectric strength of about 1500 kV/m (about 40 V/mil), and a thermal conductivity of about 5.2 W/m·K. In this example, the boron nitrite powder has an electrical resistivity of about $2.5\times10^6$ MΩm (about $9.85\times10^7$ MΩ·in) at ambient temperature, a dielectric strength of about 37500 kV/m (about 950 V/mil), and a thermal conductivity of about 30 W/m·K. As a result, the filler (i.e. the combination of the powders, has a dielectric strength greater than about 1500 kV/m (about 40 V/mil).

In other examples, other combinations of powdered materials may be used to result in an insulator having a dielectric strength greater than about 1500 kV/m (about 40 V/mil). The proportions of the different powdered materials used may be varied to target desired levels of electrical resistivity, dielectric strength and/or thermal conductivity, as well as other physical or chemical properties. In some examples, ceramic binding materials may also be used.

It will be understood that a heating element unit may include a combination of the barriers of FIG. 1*a-c* or FIGS. 3*a-c* and/or the sleeve barrier or coating barrier of FIG. 2*a-c* and a combination of at least two different electrically insulating granular materials as a filler.

As shown in FIG. 4, there is provided an electrical resistance heater 400. The electrical resistance heater comprises any of the heating element units 100, 200, 600, 700, 800 as described above, connected to an electrical power supply 500.

The invention claimed is:

1. A heating element unit for an electric resistance heater, the heating element unit comprising:
- a casing;
- a heating element within the casing;
- a first electrical supply pin provided at a first end of the heating element unit where the first electrical supply pin is in electrical contact with the heating element;
- a second electrical supply pin provided at said first end of the heating element unit where the second electrical supply pin is in electrical contact with the heating element;
- an electrically insulating filler between the heating element and the casing; and
- an electrically insulating barrier provided between portions of the first and second electrical supply pins, the electrically insulating barrier having a greater dielectric strength than the electrically insulating filler, wherein the dielectric strength of the electrically insulating barrier is greater than 1500 kV/m (greater than 40 V/mil) and wherein the electrically insulating barrier is provided in the form of a panel, a sheet or a sleeve.

2. A heating element unit according to claim 1, wherein the heating element is a first heating element, the heating element unit further comprises a second heating element, and the electrically insulating barrier is provided between portions of the first and second heating elements.

3. A heating element unit according to claim 1, wherein the electrically insulating barrier extends along at least a portion of a length of the heating element unit, parallel to a longitudinal axis of the heating element unit.

4. A heating element unit according to claim 3, wherein the electrically insulating barrier has a rectangular shape in cross-section in a plane perpendicular to the longitudinal axis.

5. A heating element unit according to claim 3, wherein the electrically insulating barrier comprises a plurality of electrically insulating barrier wall portions when viewed in cross-section in a plane perpendicular to the longitudinal axis.

6. A heating element unit according to claim 5, wherein the electrically insulating barrier wall portions are arranged radially around the longitudinal axis.

7. A heating element unit according to claim 1, wherein the electrically insulating barrier is an electrically insulating sleeve.

8. A heating element unit according to claim 1, wherein the electrically insulating barrier extends between first and second longitudinal ends, and the electrically insulating barrier tapers in a radial direction towards the first end.

9. A heating element unit according to claim 8, wherein the electrically insulating barrier is insertable into the casing in an insertion direction, wherein the first end of the electrically insulating barrier is the first part of the electrically insulating barrier to be inserted into the casing in the insertion direction.

10. A heating element unit according to claim 1, wherein the electrically insulating barrier extends only along a length of the first and second electrical supply pins within the casing, along the length of the first and second electrical supply pins within the casing and at least part of the length of the heating element, or along no greater than 50% of the length of the heating element unit.

11. A heating element unit according to claim 1, wherein the electrically insulating filler is a granular material.

12. A heating element unit according to claim 1, wherein the electrically insulating filler comprises one or more of: a metal oxide such as an alkaline earth metal, a transition metal oxide, or a post transition metal oxide; a nitride such as a Group 13 nitride or a Group 14 nitride; a silicate, aluminium silicate, aluminosilicate or phyllosilicate mineral such as mullite or mica; a glass such as soda-lime glass, borosilicate glass or aluminosilicate glass; a ceramic; a glass ceramic such as a machinable glass ceramic; a polymer such as a fluoropolymer or a silicone.

13. A heating element unit according to claim 1, wherein the electrically insulating barrier comprises one or more of: a metal oxide such as an alkaline earth metal oxide other than magnesium oxide (MgO), a transition metal oxide, or a post transition metal oxide; a nitride such as a Group 13 nitride or a Group 14 nitride; a silicate, aluminium silicate, aluminosilicate or phyllosilicate mineral such as mullite or mica; a glass such as soda-lime glass, borosilicate glass or aluminosilicate glass; a ceramic; a glass ceramic such as a machinable glass ceramic; a polymer such as a fluoropolymer or a silicone.

14. A heating element unit according to claim 1, wherein the electrically insulating barrier has a dielectric strength greater than 1500 kV/m and no greater than 39000 kV/m (greater than 40 V/mil and no greater than 1000 V/mil.

15. A heating element unit according to claim 1, wherein the electrically insulating barrier comprises one or more materials having a melting point no less than 1000° C.

16. A method of manufacturing a heating element unit for an electric resistance heating, the method comprising: providing a heating element within a casing; providing a first electrical supply pin in electrical contact with the heating element at a first end of the heating element unit; providing a second electrical supply pin in electrical contact with the heating element at said first end of the heating element unit; providing an electrically insulating filler between the heating element and the casing; and providing an electrically insulating barrier within the casing between portions of the first and second electrical supply pins; the electrically insulating barrier having a greater dielectric strength than the electrically insulating filler, wherein the dielectric strength of the electrically insulating barrier is greater than 1500 kV/m (greater than 40 V/mil) and wherein the electrically insulating barrier is provided in the form of a panel, a sheet or a sleeve.

17. An electric resistance heater comprising a heating element unit, wherein the heating element unit comprises:

a casing;

a heating element within the casing;

a first electrical supply pin provided at a first end of the heating element unit where the first electrical supply pin is in electrical contact with the heating element;

a second electrical supply pin provided at said first end of the heating element unit where the second electrical supply pin is in electrical contact with the heating element;

an electrically insulating filler between the heating element and the casing; and an electrically insulating barrier provided between portions of the first and second electrical supply pins, the electrically insulating barrier having a greater dielectric strength than the electrically insulating filler, wherein the dielectric strength of the electrically insulating barrier is greater than 1500 kV/m (greater than 40 V/mil) and wherein the electrically insulating barrier is provided in the form of a panel, a sheet or a sleeve.

18. A heating element according to claim 1, wherein the heating element comprises at least first and second sections spaced apart from one another and the electrically insulating barrier is provided between portions of the at least first and second sections of the heating element.

19. A heating element according to claim 1, wherein the electrically insulating barrier extends along the entire length of the first and second electrical supply pins within the casing.

20. A heating element according to claim 1, wherein the electrically insulating barrier extends along no greater than 50% of the length of the heating element unit.

* * * * *